(12) United States Patent
Elwell et al.

(10) Patent No.: US 10,156,336 B2
(45) Date of Patent: Dec. 18, 2018

(54) LED TAILGATE LIGHT

(71) Applicant: Putco, Inc., Des Moines, IA (US)

(72) Inventors: James P. Elwell, Grimes, IA (US); Tian Xiaojun, Guangzhou (CN)

(73) Assignee: Putco, Inc., Des Moines, IA (US)

( * ) Notice: Subject to any disclaimer, the term of this patent is extended or adjusted under 35 U.S.C. 154(b) by 0 days.

(21) Appl. No.: 15/856,621

(22) Filed: Dec. 28, 2017

(65) Prior Publication Data

US 2018/0119915 A1     May 3, 2018

Related U.S. Application Data

(63) Continuation-in-part of application No. 15/636,732, filed on Jun. 29, 2017.

(60) Provisional application No. 62/396,912, filed on Sep. 20, 2016.

(51) Int. Cl.

| | |
|---|---|
| *F21S 43/14* | (2018.01) |
| *F21S 43/19* | (2018.01) |
| *F21K 9/237* | (2016.01) |
| *B60Q 1/26* | (2006.01) |
| *F21S 43/15* | (2018.01) |

(52) U.S. Cl.
CPC ............ *F21S 43/14* (2018.01); *B60Q 1/2611* (2013.01); *F21K 9/237* (2016.08); *F21S 43/15* (2018.01); *F21S 43/195* (2018.01); *B60Q 2900/10* (2013.01)

(58) Field of Classification Search
None
See application file for complete search history.

(56) References Cited

U.S. PATENT DOCUMENTS

| | | |
|---|---|---|
| 2007/0024461 A1 | 2/2007 | Pederson |
| 2007/0258239 A1 | 11/2007 | Stein |
| 2009/0140271 A1 | 6/2009 | Sah |
| 2014/0160731 A1 | 6/2014 | Ye |
| 2015/0266411 A1* | 9/2015 | Bennie ................. B60W 10/06 701/36 |
| 2017/0074470 A1 | 3/2017 | Skergeth |

* cited by examiner

*Primary Examiner* — Elmito Breval

(74) *Attorney, Agent, or Firm* — McKee, Voorhees & Sease, PLC

(57) ABSTRACT

A tail light for installation on a vehicle having an electrical system includes a tail light housing configured to replace an existing housing of an existing tail light of the automobile, the tail light housing having a hollow interior, a circuit board positioned within the hollow interior of the tail light housing and comprising independently controllable segments having light emitting diodes (LEDs) configured to transmit light from an outward facing surface of the circuit board; and a controller electrically connected to the electrical system of the vehicle and the tail light. The controller has a microprocessor and memory. The controller is configured to receive signals from the electrical system of the vehicle, interpret the signals received from the electrical system of the vehicle, and in response control illumination of the independently controllable segments.

18 Claims, 13 Drawing Sheets

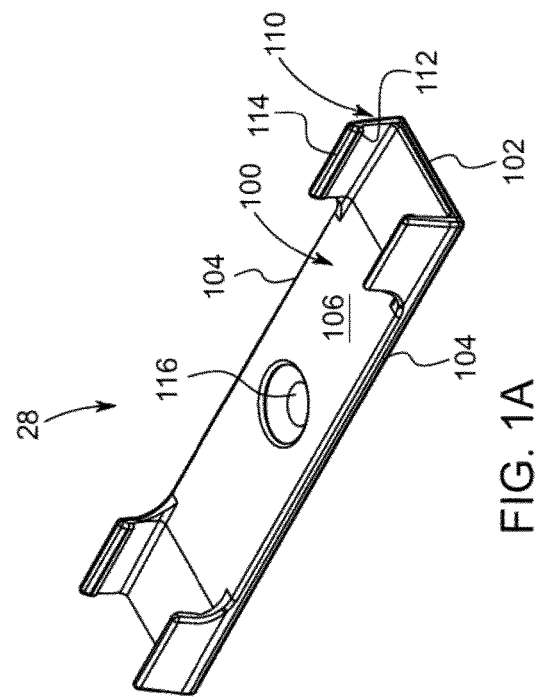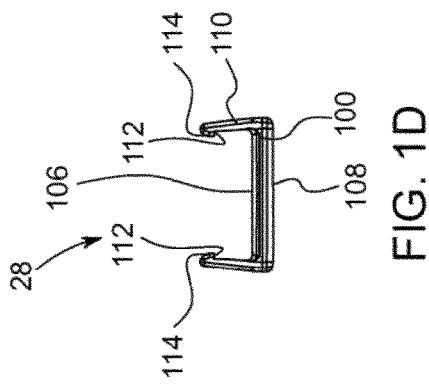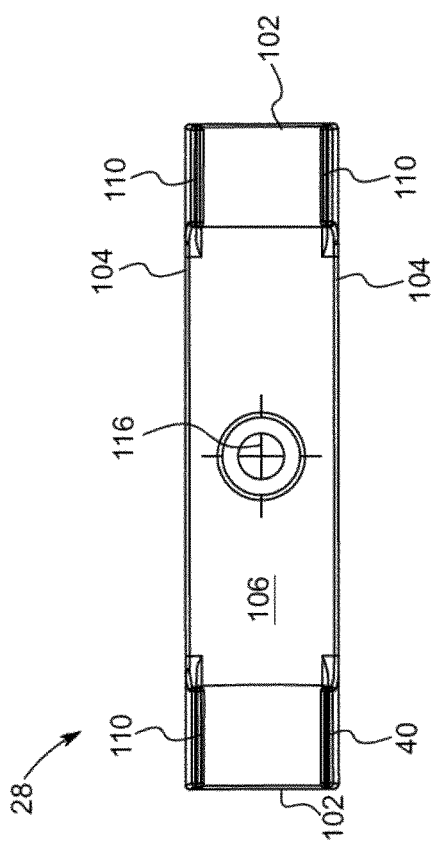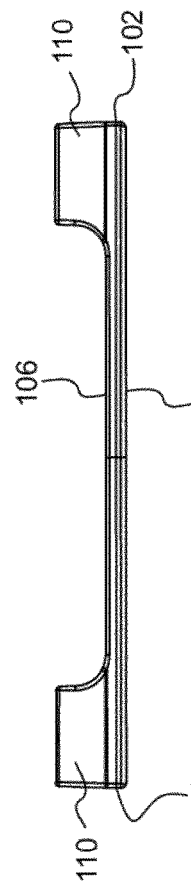

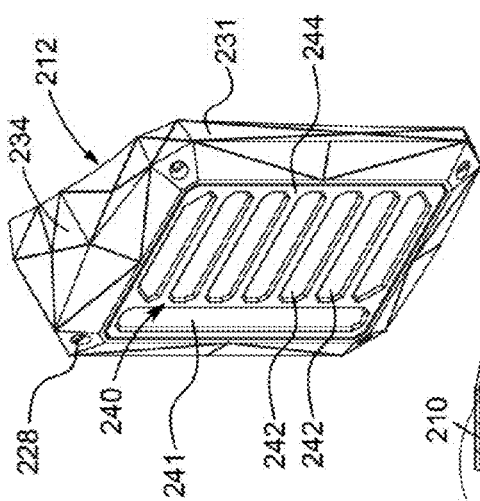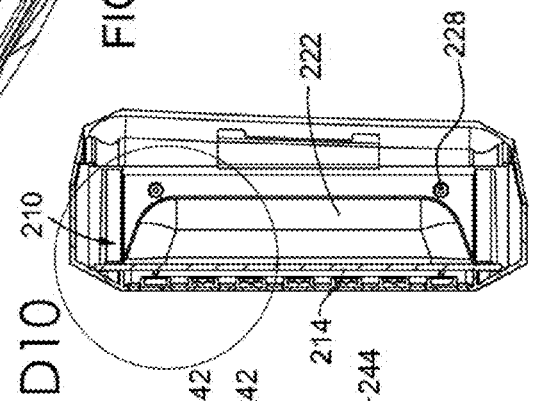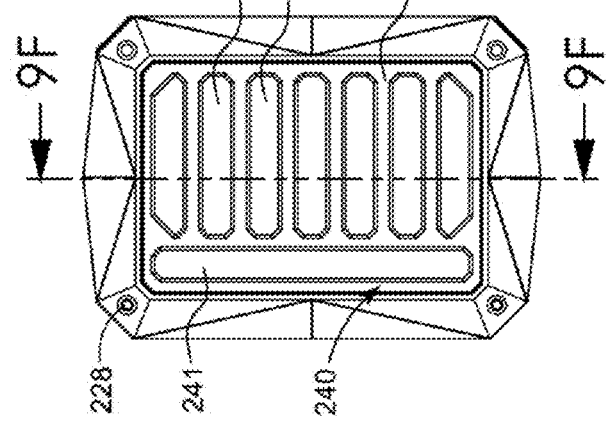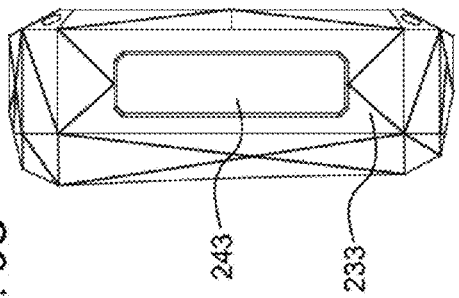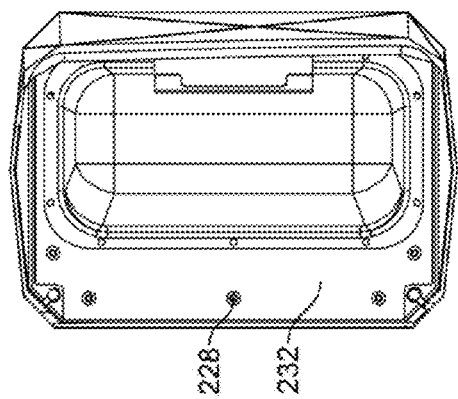

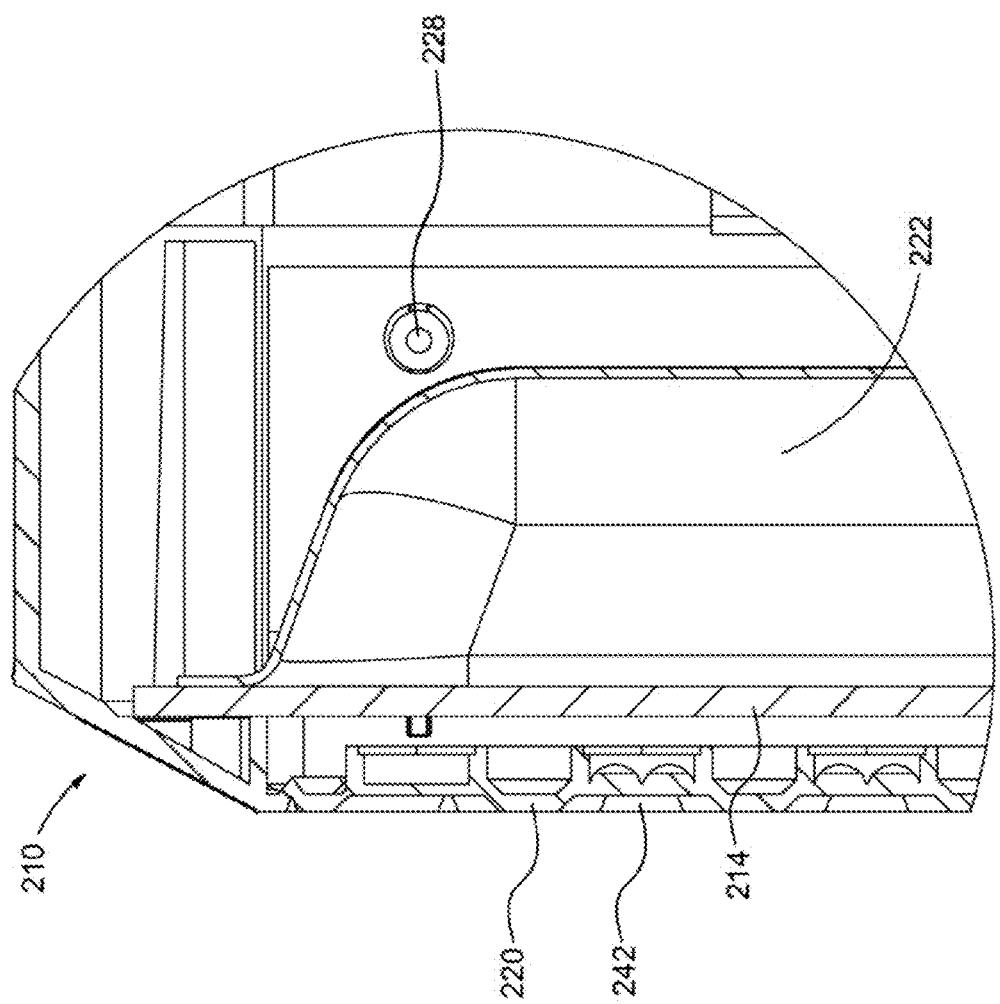

LED TAILGATE LIGHT

CROSS REFERENCE TO RELATED APPLICATIONS

This application is a Continuation-in-Part application of U.S. Ser. No. 15/636,732, filed on Jun. 29, 2017, which claims priority under 35 U.S.C. § 119 to provisional application Ser. No. 62/396,912, filed Sep. 20, 2016, all of which are herein incorporated by reference in their entirety.

FIELD OF THE INVENTION

This invention relates to lights. More specifically, and without limitation, this invention relates to a tail light for installation on a vehicle having an electrical system.

BACKGROUND OF THE INVENTION

Tail lights for automobiles and other vehicles such as boats and motorcycles are old and well known. Colloquially, the term "tail light" has been used to refer to at least the housing of the tail light as well the lights contained within the housing.

With improvements in light technology, such as the development of light emitting diodes ("LEDs"), a great variety of tail lights and light accessories installable near tail lights have been developed. These tail lights and accessory lights come in a wide array of configurations and provide their own unique functions and advantages. Often, the shape of the tail light or light accessories can depend on the make and model of the vehicle or the location of the components of the electrical system of the vehicle.

Tail lights typically come in pairs on automobiles and are designed to allow operators of other automobiles the ability to anticipate the expected path of travel of the automobile having tail lights. For example, the tail lights can be used to indicate breaking, turning and backing up. In some situations, the colors of the lights within the tail light are dictated by regulatory standards, but in other situations the operator of the vehicle may have the ability to choose the colors of the lights. Depending on the circumstances, the operator of the vehicle may have the ability to choose the manner in which the lights are illuminated and shown to operators of other vehicles. Therefore, there exists a need in the art for an improved tail light that gives the operator of a vehicle the increased ability to easily customize how the lights within the tail light are illuminated.

Tail lights come in a wide of array of configurations because the tail lights are typically designed for use with a single type, make, or model of a vehicle. Often, different types, makes, or models of a vehicle include a wide variety of electrical systems. Therefore, there exists a need in the art for a tail light that is made up of components that can interpret electrical signals from several different types, makes, or models of vehicles.

One common form of an accessory light that may be used in conjunction with tail lights is known as a light bar. Light bars are designed to fit in the small space between the upper edge of the bumper and the lower edge of a vehicle and include a long array of lights that are electrically connected to the electrical system of the vehicle. These light bars provide improved illumination and thereby improve visibility when breaking, turning and backing up.

While conventional light bars provide many advantages, they suffer from many disadvantages not solved by the prior art. Namely, the environment where light bars exist is extremely caustic. For example, the space on the back of a pickup truck between the bumper and the tailgate is a wet and dirty environment that is also exposed to road chemicals, exhaust fumes, and whatever chemicals or other contaminants drain out of the bed of the pickup truck. In addition, in this position on the exterior of the vehicle, light bars are exposed to the elements and must endure temperature extremes from the coldest of cold nights to the hottest of hot days. Due to these extreme conditions, many conventional light bars have short lives due to the combined effects of temperature extremes and infiltration of water and contaminants that lead to premature failure or short useful lives.

Complicating matters further, the space between the bumper and the tailgate on most trucks is extremely limited. That is, the vertical height between the top of the bumper and the bottom of the tailgate and fenders is increasingly vertically narrow. This means that the light bar must be extremely compact in size and shape otherwise it cannot be used for its intended purpose. This means that the form factor of the light bar must be extremely compact which complicates the electronic assembly of the system, heat dissipation requirements, weather proofing, installation and the overall design and configuration of the system.

Therefore, in view of the disadvantages in the prior art, for the reasons stated above, and for other reasons stated below which will become apparent to those skilled in the art upon reading and understanding the specification, claims, and drawings there exists a need in the art for an improved light bar.

Thus, it is a primary object of the invention to provide an easily customizable tail light that can replace the existing tail light of a vehicle.

Another object of the invention is to provide a tail light or light bar that improves upon the state of the art.

Yet another object of the invention is to provide a replacement tail light that may be used in conjunction with a light bar.

Yet another object of the invention is to provide a tail light or light bar that has a long useful life.

Yet another object of the invention is to provide a tail light or light bar that can be used on practically any vehicle.

Yet another object of the invention is to provide a tail light or light bar that is easily installed.

Another object of the invention is to provide a tail light or light bar that can be connected to practically any vehicle's electrical system.

Yet another object of the invention is to provide a tail light or light bar that provides multi-purpose functionality.

Another object of the invention is to provide a tail light or light bar that has an aesthetically pleasing appearance.

Yet another object of the invention is to provide a tail light or light bar that is easy to use.

Another object of the invention is to provide a tail light or light bar that improves safety.

Yet another object of the invention is to provide a tail light or light bar that includes white, yellow/amber and red lights.

Another object of the invention is to provide a tail light or light bar that includes breaking, backup and turning functionality.

Yet another object of the invention is to provide a tail light or light bar that efficiently dissipates heat.

Another object of the invention is to provide a tail light or light bar that is separated into electrical segments that are independently controllable.

Yet another object of the invention is to provide a tail light or light bar that is bright.

Another object of the invention is to provide a tail light or light bar that is formed of a plurality of independent lights but appears to be a single continuous light strip when illuminated due to the density of the independent lights.

Yet another object of the invention is to provide a tail light or light bar that can be installed without drilling into the body of the vehicle.

Another object of the invention is to provide a tail light or light bar that is durable. Yet another object of the invention is to provide a tail light or light bar that is rugged.

Another object of the invention is to provide a tail light or light bar that has an intuitive design.

Yet another object of the invention is to provide a tail light or light bar that is formed of a minimum number of parts.

Another object of the invention is to provide a tail light or light bar that is relatively inexpensive to manufacture.

Yet another object of the invention is to provide a tail light or light bar that provides value, utility and novelty to the user.

Another object of the invention is to provide a light bar that is water proof.

Yet another object of the invention is to provide a light bar that is weather proof.

Yet another object of the invention is to provide a light bar that is can be exposed to the elements.

Yet another object of the invention is to provide a light bar that is contaminant proof.

Another object of the invention is to provide a light bar that has a low profile.

Yet another object of the invention is to provide a light bar that can be installed with adhesives and clips.

Another object of the invention is to provide a light bar that can be installed using adhesives.

These and other objects, features, or advantages of the invention will become apparent from the specification, claims and drawings.

SUMMARY OF THE INVENTION

According to one embodiment, the present invention is directed towards a tail light for installation on a vehicle having an electrical system. The tail light has a housing configured to replace an existing housing of an existing tail light of the automobile and has a hollow interior. A circuit board is positioned within the hollow interior of the tail light housing and comprises independently controllable segments having light emitting diodes (LEDs) configured to transmit light from an outward facing surface of the circuit board. A controller is electrically connected to the electrical system of the vehicle and the tail light. The controller has a microprocessor and a memory. The controller is configured to receive signals from the electrical system of the vehicle, to interpret the signals received from the electrical system, and in response to control illumination of the independently controllable segments of the tail light. The space between the outward facing surface of the circuit board and an inward facing surface of the tail light housing may be filled with an encapsulant thereby sealing the LEDs within the tail light housing, and the encapsulant may be formed of a flowable plastic. The controller may be further configured to select LEDs to illuminate based on their color. The controller may be further configured to select the duration of illumination of the LEDs. The LEDs may be chip-on-board LEDs. One portion of the tail light housing covering the LEDs may be formed of a transparent or translucent plastic material. The outward facing surface of the circuit may be black to minimize the noticeability of the tail light when not in operation. The tail light housing may be polygonal in nature and may include a back face, top and bottom faces, an exterior side face, an interior side face, a cover including a non-transparent front face, and means for attaching the tail light housing to the rear portion of the automobile. The independently controllable segments may be electrically connected to one another. The independently controllable segments may include horizontally oriented brake light segments located behind the at least one portion of the tail light housing positioned in a column. Some of the LEDs located on the brake light segments may emit white light when turned on and may turn on when the controller receives a signal from the electrical system of the vehicle that the vehicle is in reverse. The remaining LEDs may emit red light when turned on and may turn on when the controller receives a signal from the electrical system of the vehicle that brakes of the vehicle are applied. In the preceding configuration, the remaining LEDs that emit red light may flash when the controller receives a signal from the electrical system of the vehicle that hazards of the vehicle are applied or a corresponding turn signal of the vehicle is applied. The remaining LEDs that emit red light on individual brake light segments may be turned on at different times and staggered with respect to the LEDs located on different individual brake light segments to create an optical pattern when the controller receives a signal from the electrical system of the vehicle that the turn signal is applied. The optical pattern may be designed for a left or a right turn signal. There may be additional LEDs on the circuit board that emit blue light or any other known color of light. The independently controllable segments may further include a first horizontally oriented reverse light segment or turn signal segment on the upper face of the tail light housing and a second horizontally oriented reverse light segment or turn signal segment above the brake light segments on the front face of the tail light housing. The controller may be generally universal. The controller may be configured to simultaneously control illumination of LEDs of a light bar installed on the vehicle.

In another embodiment, a method of manufacturing a tail light is contemplated. The method includes providing a tail light housing configured to replace an existing housing for an existing tail light of the automobile, the tail light housing having a hollow interior; providing a circuit board including independently controllable segments having light emitting diodes (LEDs) configured to transmit light from an outward facing surface of the circuit board; inserting the circuit board within the hollow interior of the tail light housing; flowing a second layer of encapsulant into the hollow interior of the tail light housing after the circuit board is inserted within the hollow interior of the tail light housing thereby filling at least some of the remaining space within the hollow interior of the tail light housing with encapsulant; and sealing the LEDs within the tail light housing. The method may also include flowing a first layer of encapsulant over the outward facing surface of the circuit board; and allowing the first layer of encapsulant to cure thereby sealing the LEDs of the circuit board prior to inserting the circuit board into the hollow interior of the tail light housing.

BRIEF DESCRIPTION OF THE DRAWINGS

FIG. 1A is a perspective view of a clip for use with the vehicle light bar system.

FIG. 1B is an elevation view of the clip shown in FIG. 1A, the view taken from the top surface of the clip.

FIG. 1C is an elevation view of the clip shown in FIGS. 1A and 1B, the view taken from the side surface of the clip.

FIG. 1D is an elevation view of the clip shown in FIGS. 1A and 1B and 1C, the view taken from the end of the clip.

FIG. 9A is a perspective view of a tail light housing according to aspects of the present disclosure.

FIG. 9B is a top view of the tail light housing of FIG. 9A according to aspects of the present disclosure.

FIG. 9C is a back view of the tail light housing of FIG. 9A according to aspects of the present disclosure.

FIG. 9D is a side view of the exterior side of the tail light housing of FIG. 9A according to aspects of the present disclosure.

FIG. 9E is a front view of the tail light housing of FIG. 9A according to aspects of the present disclosure.

FIG. 9F is a cross-sectional side view taken along line 9F-9F that looks past the interior side of the tail light housing of FIG. 9A, according to aspects of the present disclosure.

FIG. 10 is a detailed view of the tail light housing of FIG. 9A inside detail D10 according to aspects of the present disclosure.

DETAILED DESCRIPTION OF THE PREFERRED EMBODIMENT

Figure 2:
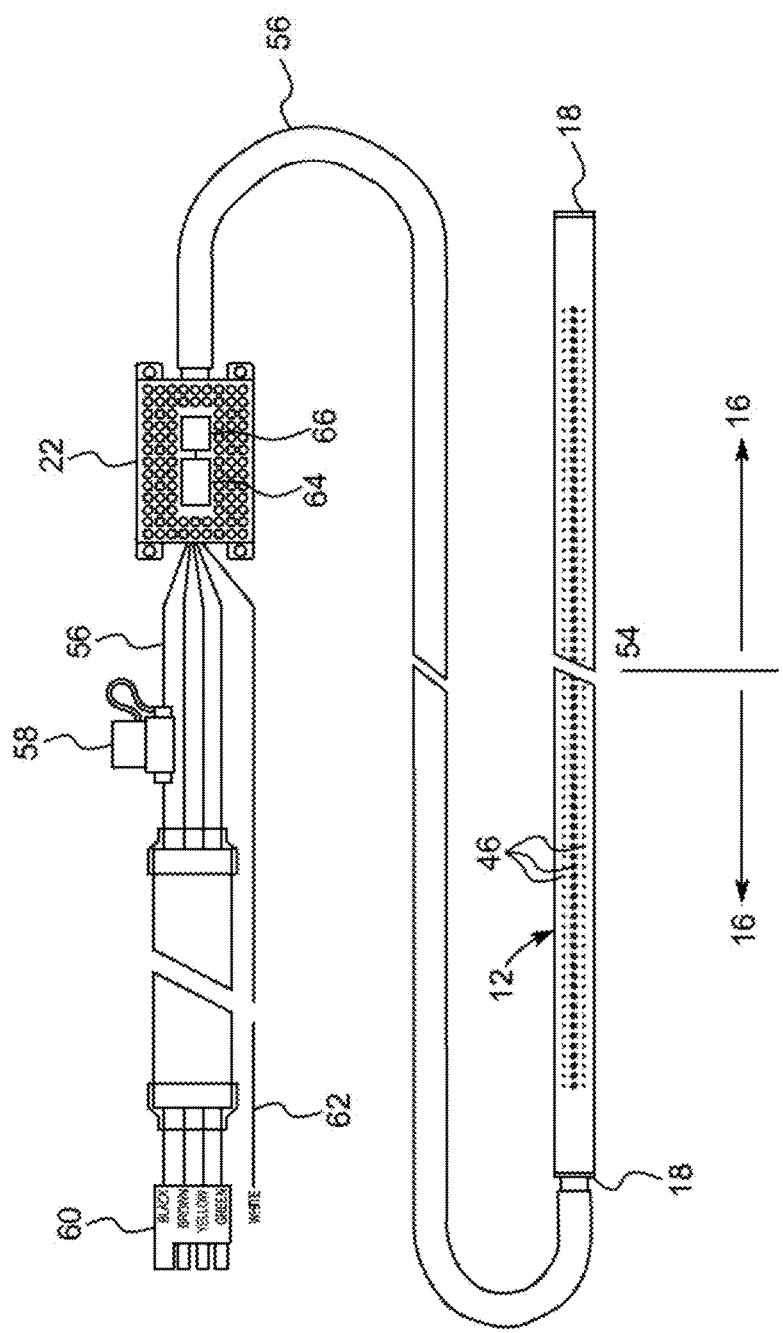
FIG. 2 is an elevation schematic view of the light bar system, the view showing the light bar having three rows of LEDs.

The following definitions and introductory matters are provided to facilitate an understanding of the present invention.

The singular terms "a," "an," and "the" include plural referents unless context clearly indicates otherwise. Similarly, the term "or" is intended to include "and" unless the context clearly indicate otherwise. The term "or" means any one member of a particular list and also includes any combination of members of that list.

Reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized, and that mechanical, procedural, and other changes may be made without departing from the spirit and scope of the invention. The following detailed description is, therefore, not to be taken in a limiting sense, and the scope of the invention is defined only by the appended claims, along with the full scope of equivalents to which such claims are entitled.

As used herein, the terminology such as vertical, horizontal, top, bottom, front, back, end, sides, and the like, are referenced according to the views presented. It should be understood, however, that the terms are used only for purposes of description, and are not intended to be used as limitations. Accordingly, orientation of an object or a combination of objects may change without departing from the scope of the invention.

The light bar described herein is described, as one example, for use with a pickup truck. This is by way of example only, and any use is hereby contemplated and reference to use on a pickup truck is not to be limiting. Instead, the light bar presented herein is contemplated for use in any application and may be used on any vehicle. In addition, the shape and dimensions of the light bar can be modified without departing from the spirit and scope of the invention.

Light Bar System:

With reference to the figures, light bar system 10 is presented (also referred to herein as light bar 10). The light bar system 10 includes the component pieces of light bar housing 12, circuit board 14 which is separated into segments 16, end caps 18, encapsulant 20, control box 22 having a microprocessor 24 and memory 26, among other components as is described herein. The light bar system 10 also includes one or more clips 28 that facilitate connection of the light bar 10 to a truck or vehicle 30 (not shown in detail).

Light Bar Housing:

Light bar housing 12 is formed of any suitable size, shape and design and is configured to house the electrical components of the light bar system 10. In one arrangement, as is shown, light bar housing 12 is an elongated hollow member that extends a length between opposing ends that are closed by end caps 18. Light bar housing 12 includes a back wall 32 that is generally flat and planar in shape when viewed from the side. The upper and lower edges of back wall 32 that extend the length of light bar housing 12 connect to opposing sidewalls 34. Like back wall 32, sidewalls 34 are generally flat and planar in shape. Opposing sidewalls 34 connect at their rearward edges to the upper and lower edges of back wall 32 and extend in approximate parallel spaced alignment to one another. Sidewalls 34 extend in approximate perpendicular alignment to back wall 32. This arrangement, with the generally planar and perpendicular alignment of the back wall 32 and side walls 34 form a generally rectangular space between the back wall 32 and opposing side walls 34, as can be seen from the side cut away view of FIG. 3 and FIG. 4.

The forward edges of sidewalls 34 connect to a cover portion 36 of light bar housing 12. In the arrangement shown, cover portion 36 has a generally smooth and curved exterior surface that connects at its upper and lower edges to the forward edges of sidewalls 34. In the arrangement shown, cover portion 36 has a convex exterior surface, and a concave interior surface, that helps to shed water, dirt and contaminants off of the housing. However, any other size, shape and design is contemplated for use as cover portion 36, including a flat and square shape, a peaked shape, a concave shape or any other shape.

Figure 3:
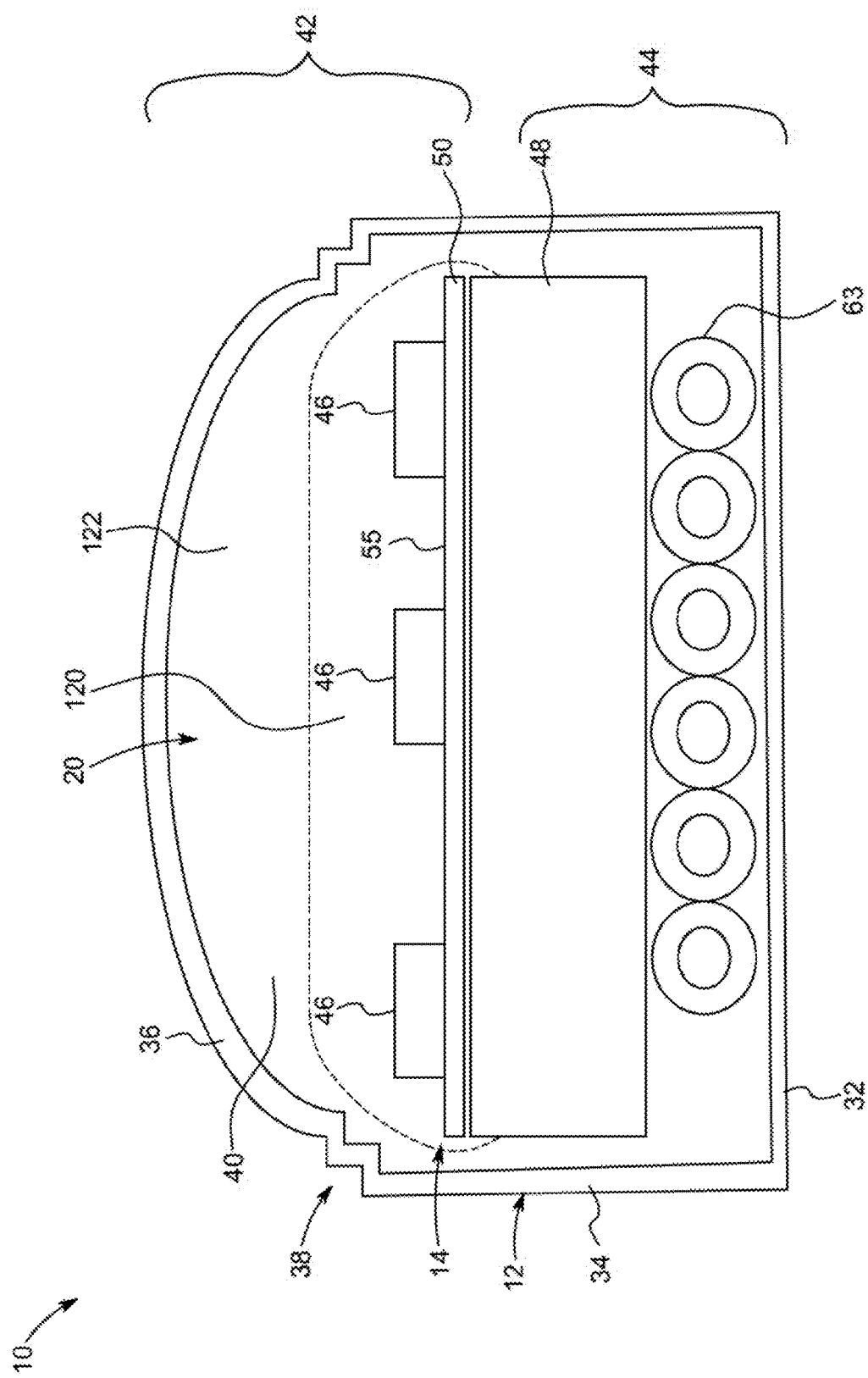
FIG. 3 is an elevation view of a side cut away of the assembled housing of the light bar.
Figure 4:
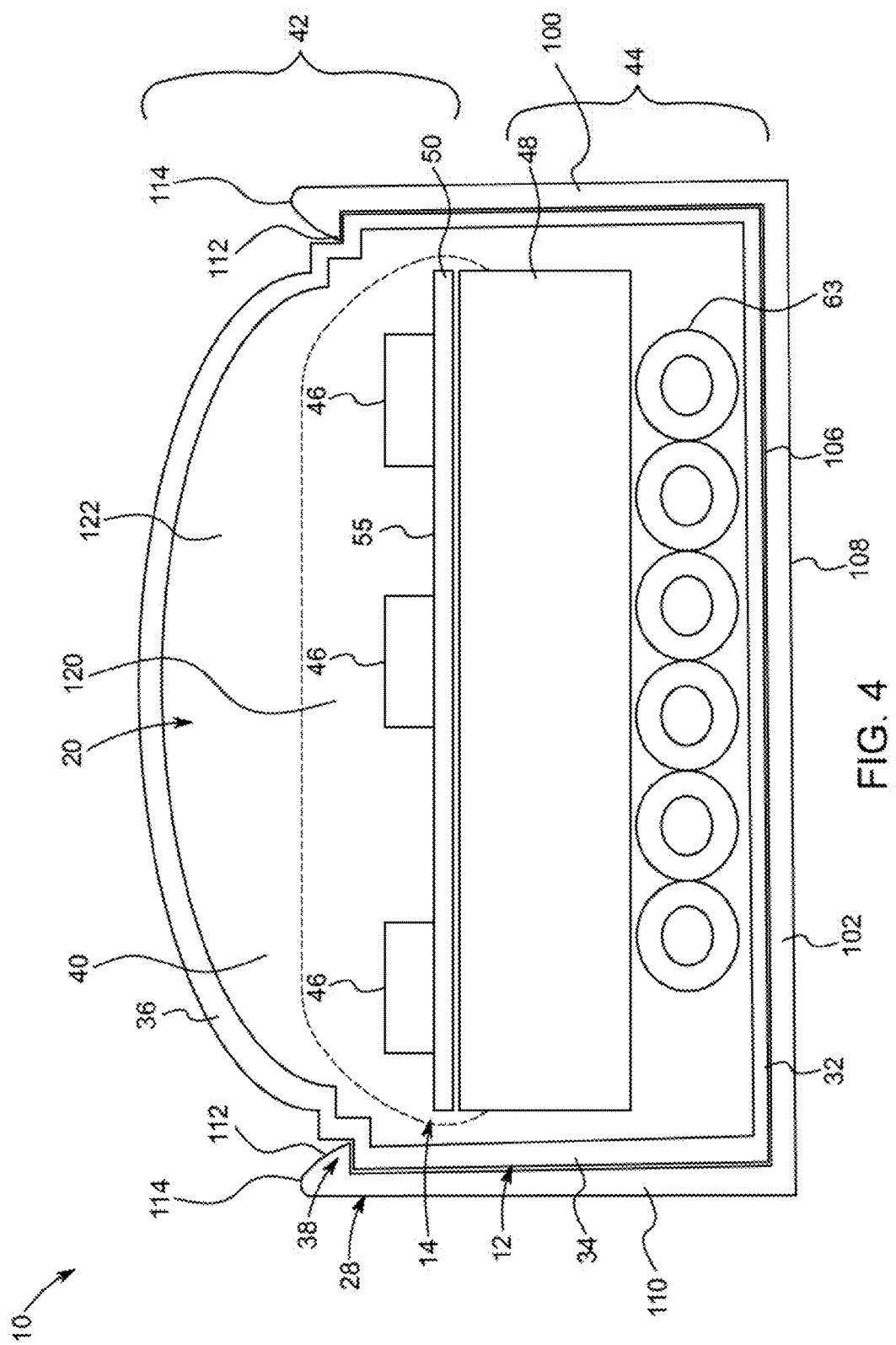
FIG. 4 is a side elevation view of a side cut away of the assembled housing of the light bar of FIG. 3.
Figure 5:
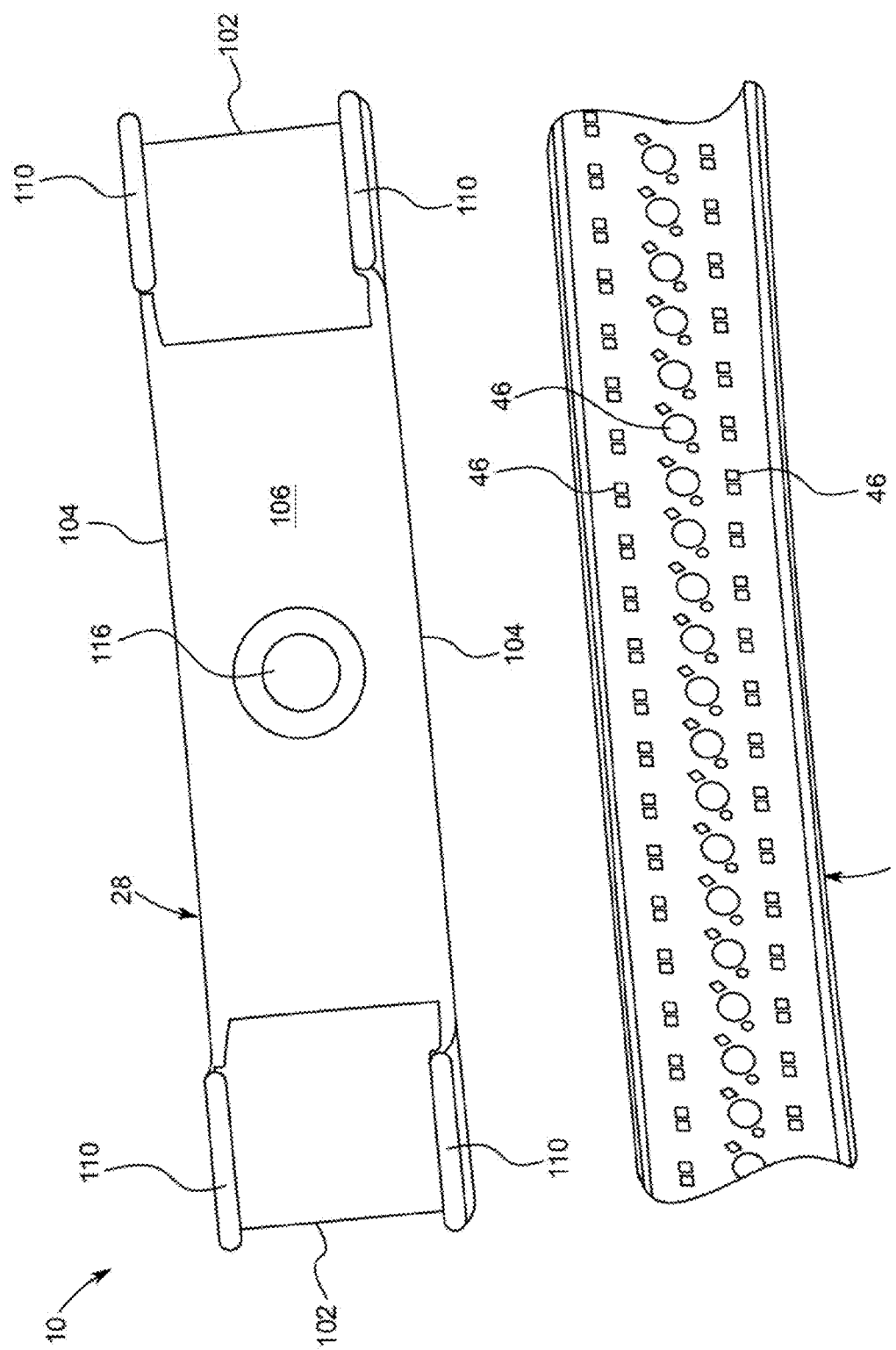
FIG. 5 is a perspective view of the clip of FIGS. 1A-1D shown in a side by side position to a portion of the housing of the light bar.
Figure 6:
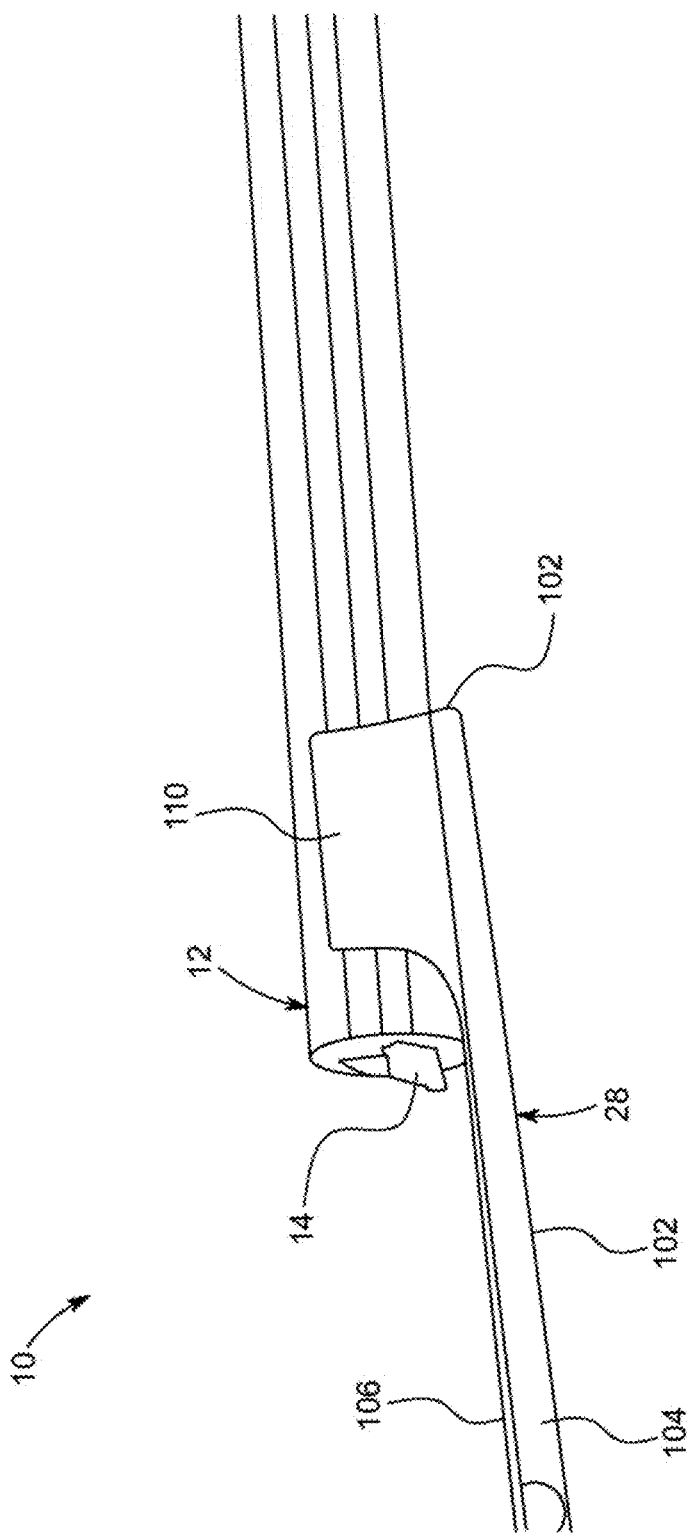
FIG. 6 is a perspective view of the clip of FIGS. 1A-1D shown partially installed on a portion of the housing of the light bar.
Figure 7:
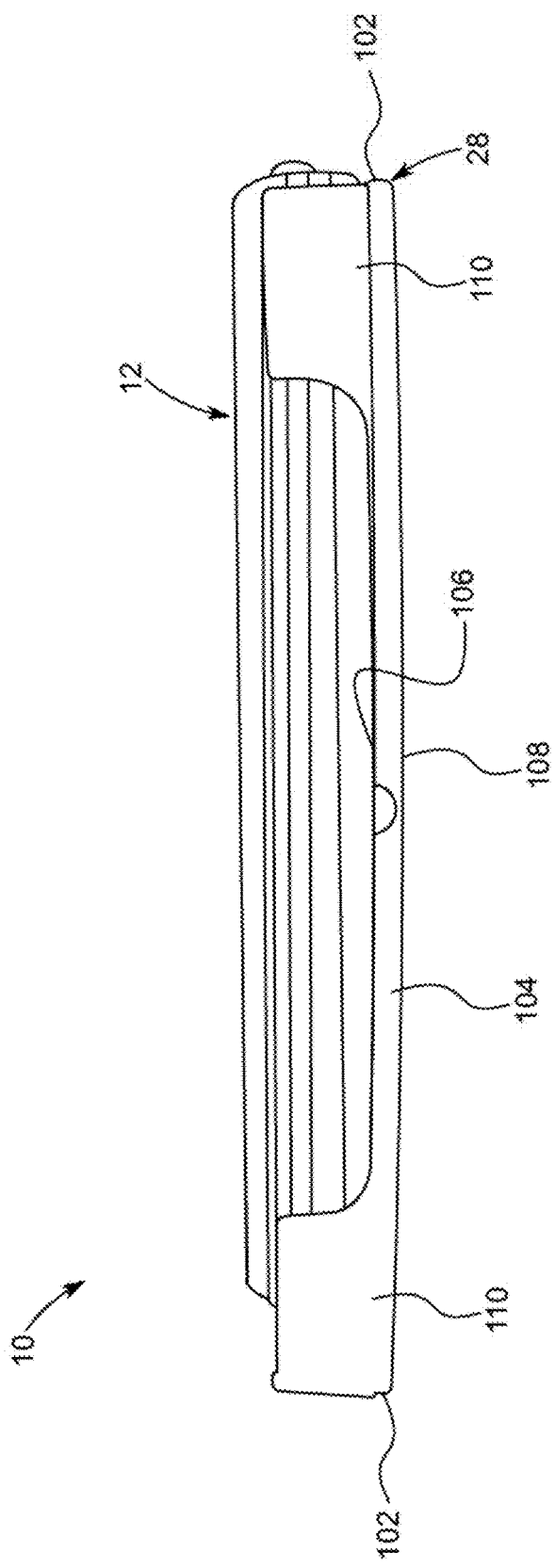
FIG. 7 is a perspective view similar to FIG. 6 with the portion of the housing of the light bar fully installed within the clip.
Figure 8:
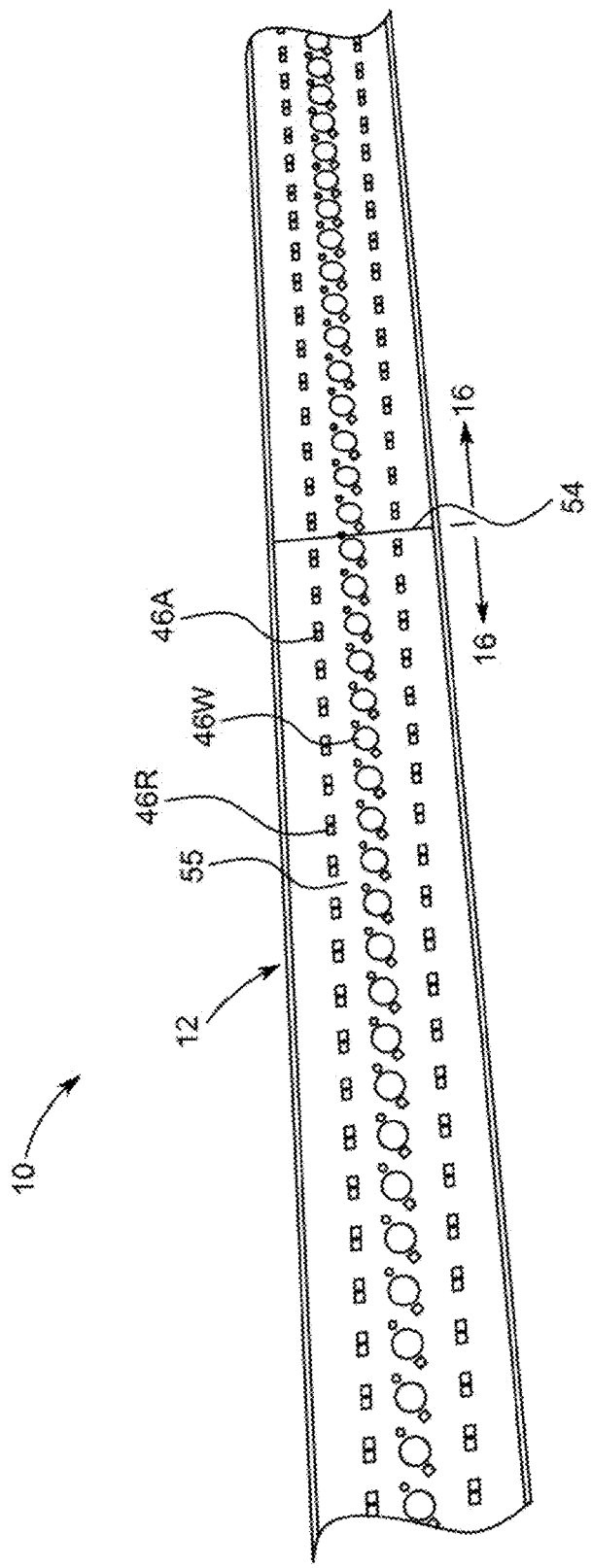
FIG. 8 is a perspective view of the fully assembled light bar showing three rows of LEDs visible through the transparent portion of the housing of the light bar: a row of red LEDs, a row of white LEDs and a row of amber LEDs.

In one arrangement, as is shown, one or more features 38 are positioned at the intersection or connection point between sidewalls 34 and cover portion 36. Features 38 are formed of any suitable size, shape and design and are configured to support the engagement between and connection of clip 28 to light bar housing 12 and to facilitate a strong and durable hold there between while also facilitating selective removal of light bar housing 12 from clip 28. As one example, as is shown, features 38 include a first step or ledge positioned between the exterior surface of sidewalls 34 and where cover portion 36 connects to sidewalls 34. In this arrangement, the first step of features 38 include a small generally planar portion that extends in approximate parallel spaced relation to back wall 32 which serves as a connection point for clip 28 to hold on to and secure light bar housing 12. That is, in the arrangement shown, the first step of features 38 is a small generally right-angle notch or step between sidewall 34 and cover portion 36 when viewed from the side as can be seen in FIG. 3 and FIG. 4. Also, in the arrangement shown, a second step is also positioned just above the first step of features 38 and is configured in a similar manner. That is, in the arrangement shown, the second step of features 38 is a small generally right-angle notch or step between sidewall 34 and cover portion 36 that connects at its lower or outward side to the first step of features and connects at its upper or outward side to cover portion 38 when viewed from the side as can be seen in FIG. 3 and FIG. 4. In the arrangement wherein more than one step is present in features 38, clip 28 may connect to only one of the steps or both of the steps. Any number of steps is hereby contemplated for use as features 38 such as none, one, two, three, four or more. Alternatively, any other size, shape and design for features 38 is hereby contemplated for use, such as a hook, a concave recess that is recessed inward toward back wall 32, a protrusion or any other shaped feature 38, which in some configurations or applications may provide a more-affirmative and durable connection between clip 28 and light bar housing 12.

The connection of back wall 32, sidewalls 34 and cover portion 36 define a hollow interior 40 there between which houses and holds circuit board 14 therein. In one arrangement, light bar housing 12 is formed of a single monolithic piece or extrusion and therefore the features, size and shape of light bar housing 12 extend the length of light bar housing 12. Being formed of a single piece reduces the number of parts, simplifies the manufacturing process in many ways (and complicates it in other ways) and provides enhanced water proofing and contaminant protection as there are no seams or connection points for infiltration of water or contaminants into the hollow interior 30 of light bar housing 12. As such, the hollow interior 40 of light bar housing 12 serves as a complete or as close to a complete shield to water and contaminants as is possible. This arrangement provides enhanced the water and contaminant protection for the components positioned within the hollow interior 40 of light bar housing 12. To provide further protection, the components positioned within the hollow interior 40 of light bar housing 12 are encapsulated in an encapsulant 20 as is further described herein. Having a consistent size and shape throughout the length of light bar housing 12 facilitates easier installation as clip 28 can be positioned along any portion of light bar housing 12 and the components can be inserted into hollow interior 40 of light bar housing 12 from either end and these components may be slid along the length of hollow interior 40 of light bar housing 12 during installation.

In the arrangement shown, light bar housing 12 includes a transparent portion 42 and a non-transparent portion 44. In one arrangement, the back wall 32 and the sidewalls 34 or only the rearward portions of sidewalls 34 of light bar housing 12 are painted with a black or dark or non-transparent paint which is placed on the exterior or the interior of light bar housing 12. Alternatively these portions of light bar housing 12 (back wall 32 and all or a portion of sidewalls 34) are formed of a black or dark or non-transparent material that prevents or reduces light transmission therethrough. In this arrangement, the cover portion 36 and the forward portions of sidewalls 34 of light bar housing 12 are formed of a clear, transparent, translucent or other material that allows light to be transmitted therethrough. In one arrangement, the color black has been tested with success as it reduces the appearance of the light bar system 10 when installed on vehicle 30. In the arrangement where the back wall 32 and sidewalls 34 and the cover portion 36 are formed of different colored materials, the back wall 32 and sidewalls 34 are manufactured as a single unitary piece of two different colored materials or two materials with different colors and light-transmission properties, such as a co-extrusion process or the like so as to form a single unitary and simultaneously manufactured piece without seams or other areas where water or contaminants can infiltrate the light bar housing 12.

In an alternative arrangement, light bar housing 12 is formed multiple pieces. In one arrangement, a back portion or non-transparent portion 44, connects to a front portion or transparent portion 42 along a connection point or seamline that is glued, welded, adhered or connected in any other way to one another. In this arrangement, the back portion or non-transparent portion 44 is formed of a black or dark or non-transparent material or is painted with a black or dark or non-transparent paint, whereas the front portion or transparent portion 42 is formed of a transparent or translucent material that allows light to be transmitted therethrough. In one arrangement, the back portion or non-transparent portion 44 is formed of the back wall 32 and the entirety of the sidewalls 34 which connect to the cover portion 36 at the outward ends of sidewalls 34. In another arrangement, the back portion or non-transparent portion 44 is formed of the back wall 32 and a portion of the sidewalls 34 which connect to the cover portion 36 which includes a portion of the sidewalls 34 and as such, sidewalls 34 connect to one another along a seamline where the back portion of the sidewalls 34 are part of the nontransparent portion 44 and the forward portion of the sidewalls 34 are part of the transparent portion 42. Any other configuration is hereby contemplated for use.

Circuit Board:

Circuit board 14 is formed of any suitable size, shape and design and is configured to house a plurality of light emitting diodes 46 ("LEDs") thereon and facilitate selective illumination of the LEDs 46. In one arrangement, as is shown, circuit board 14 is formed of a backing material 48 and a circuitry layer 50.

Backing material 48 is formed of any suitable size, shape and design and serves to provide support to circuitry layer 50 as well as serve heat dissipation purposes. In one arrangement, backing material 48 is formed of a metallic material, such as aluminum, copper, an aluminum alloy, a copper alloy, or any other metallic material, rigid material or material the provides for support or heat dissipation. In an alternative arrangement backing material 48 is formed of a non-metallic material.

Backing material 48 provides structural support for circuitry layer 50 as well as heat dissipation. That is, when circuitry layer 50 is connected to backing material 48 and backing material 48 is formed of a material with a high coefficient of diffusivity (such as aluminum, an aluminum alloy, copper, a copper alloy, or another alloy material) backing material 48 helps to absorb and diffuse heat generated by LEDs 46. To maximize space utilization within the hollow interior 40 of light bar housing 12, backing material 48 is relatively thick, and substantially thicker than circuitry layer 50, and backing material 48 fits within the hollow interior 40 of light bar housing 12 within relatively close and tight tolerances. In the arrangement shown, when viewed from the side, backing material 48 is generally rectangular in shape with an opposing back wall and forward wall that approximate the size of or are slightly the size of the interior surface of back wall 32 of light bar housing 12 and are positioned in approximate parallel planar spaced relationship with one another; and similarly backing material 48 has a pair of opposing sidewalls that extend a portion of the interior surface of sidewalls 34. The width of backing material 48 is slightly smaller than the width between the interior surfaces of opposing sidewalls 34 of light bar housing 12 so as to facilitate insertion of backing material 48 into the hollow interior 40 of light bar housing 12. The height of backing material 48 is smaller than the height of the interior surfaces of sidewalls 34 so as to provide room for ribbon wire 63 behind backing material 48 as well as to provide room for circuitry layer 50 and LEDs 46 on top of backing material 48. Maximizing the size of backing material 48 within the hollow interior 40 of light bar housing 12, while providing ample room for the other components of the light bar system 10 maximizes heat diffusion and structural rigidity provided by backing material 48.

Circuitry layer 50 is formed of any suitable size shape and design and provides the electrical connection between the electrical components of the light bar system 10. In one arrangement, circuitry layer 50 includes the electrical leads and traces that connect and interconnect the electrical components of light bar system 10 including LEDs 46, ribbon wire 63 and control box 22. Circuitry layer 50 may be formed of multiple layers itself so as to provide electrical isolation between the many electrical leads therein.

While backing material 48 and circuitry layer 50 are described as separate components in one arrangement they may be formed as a single component, or alternatively they may be formed of separate components. That is, circuitry layer 50 may be manufactured separately and then applied to backing material 48. Alternatively, circuitry layer 50 may be formed onto or into backing material 48.

Circuit board 14 is formed of any suitable size shape and design and is configured to house, hold and provide the electrical connections for LEDs 46. In the arrangement shown, circuit board 14 includes three rows of densely packed LEDs 46 that extend a length or the entire length between end caps 18 within the hollow interior 40 of light bar housing 12, including a row of amber LEDs 46A, a row of white LEDs 46W and a row of red LEDs 46R. In the arrangement shown, the white LEDs 46 are positioned in the middle with the red and amber LEDs 46 positioned on opposite sides of the row of white LEDs 46, however any other configuration is hereby contemplated for use.

To provide independent control of various portions of light bar system 10, circuit board 14 is electrically separated into a plurality of segments 16. Segments 16 allow for independent control of each segment. In the arrangement shown, light bar 10 is separated approximately down its middle at a seamline 54 into two separate segments 16, such as a driver's side segment 16 and a passenger side segment 16. Segments 16 can be independently illuminated as well as simultaneously illuminated. Separating light bar 10 into driver side and passenger side segments 16 allows the control box 22 to illuminate the entire length of light bar 10 for breaking and backing up, as well as illuminating only one segment 16 for the turning signal. While only two segments 16 are shown, any number of segments 16 are hereby contemplated for use.

To reduce the appearance of the light bar 10 when installed, the exterior facing surface 55 of circuit board 14 is a dark or black color. This dark or black color reduces the visibility of the light bar 10 when installed thereby improving the aesthetic appearance of the light bar 10.

Endcaps & Wiring:

End caps 18 are formed of any suitable size, shape and design and serve to close the hollow interior 40 of light bar housing 12 at its outward ends. In one arrangement, one end cap 18 allows the passage of wiring 56 therethrough whereas the opposite end cap 18 does not have wiring 56 passing therethrough and as such this end cap 18 simply closes the opposite end of light bar housing 12 from the wiring end cap 18. To continue with the low-profile appearance theme of the light bar 10, in one arrangement, end caps 18 are formed of a black material, like the back portion or non-transparent portion 44 of light bar housing 12. End caps 18 are friction fit as well as sealed within the hollow interior 40 of light bar housing 12 so as to prevent water and contaminants from entering hollow interior 40. End caps 18 are sealed into light bar housing 12 by any manner, method or means such as gluing, adhering, welding, heat shrinking, taping, wrapping or any combination thereof or the like.

Wiring 56 is made up of an electrically conductive material such as a metal or alloy. Non-limiting examples of electrically conductive materials include, gold, gold alloys, copper, copper alloys, silver, silver alloys, nickel, nickel alloys, palladium, palladium alloys, zinc, and zinc alloys may be used. In at least one embodiment, the use of a gold alloy for wiring 56 is preferred.

Wiring 56 exiting one end of light bar housing 12 electrically connects to control box 22 and includes a fuse 58 before electrically connecting to a plug 60. Plug 60 is formed of any suitable size, shape and design and in one arrangement is formed of a conventional four-way trailer plug that electrically connects to the electrical system of many standard vehicles 30. However any other form of plug is hereby contemplated for use as is directly wiring the wiring 56 of light bar 10 into the wiring system of vehicle 30.

In one arrangement, wiring 56 also includes one or more signal leads 62. Signal lead 62 is an electrical lead that is configured to be electrically connected to electrical system of vehicle 30, and more specifically a reverse light lead, a left turn signal lead, a right turn signal lead or another electrical lead of vehicle 30. In combination, plug 60 and signal lead(s) 62 are configured to receive power and operational signals from vehicle 30 and provide operational signals to light bar 10. That is, as a user operates vehicle 30, the lights in the back of the vehicle 30, where light bar 10 is positioned, are controlled in various ways. That is, when the user presses the brake pedal, the brake lights of the light bar 10 illuminate until the brake pedal is released; when the user engages a turn signal, the appropriate turn signal of the light bar 10 periodically flashes until the turn signal is disengaged; when the user places the vehicle 30 in reverse, the reverse lights of the light bar 10 illuminate until the vehicle 30 is removed from reverse; when the user turns the hazard lights on, the brake lights of the light bar 10 flash until the hazard lights are turned off, and so on. Signal lead 62, as well as the other wires of wiring 56, are configured to receive and transmit the operational signals to the light bar 10 so that light bar 10 can illuminate appropriately and in coordination with the lights of vehicle 30.

In the arrangement wherein the light bar 10 is formed of two segments 16, a ribbon wire 63 extends outward from an end of each segment 16. That is, a ribbon wire 63 connects to the first segment 16 and extends outward through the end cap 18 that allows passage of the ribbon wire 63 therethrough. A second ribbon wire 63 extends under the circuit board 14 of the first and second segment 16 and electrically connects to the end of second segment 16 opposite first segment 16. This ribbon wire 63 also extends out the same end cap 18 such that both wires extend out of the same end of light bar housing 12. In the arrangement shown, ribbon wire 63 includes six wires, or three pairs of wires, one pair for each color of LED 46 (white LED 46W, red LED 46R, and amber LED 46A). As depth of the light bar system 10 is important to maintain the low-profile nature of the light bar system 10, to minimize the depth of the system, only two segments 16 are used and therefore only one layer of ribbon wire 63 extends below the segments 16. Having the ribbon wire 63 extend out of the outward ends of the segments 16 allows the circuit boards 14 and backing material 48 and circuitry layer 50 connect to one another in flush alignment with one another at seamline 54 in flush and flat engagement with little to no gap there between. This allows for practically seamless illumination between opposing segments 16 and makes it practically impossible to distinguish between the opposing segments 16 as the spacing of the LEDs 46 is maintained across the seamline 54. That is, the seamline 16 does not disturb the continuous spacing of LEDs 46 from one segment 16 to the other segment 16. In fact, the seamline 54 is itself hard to see when light bar 10 is inspected.

Control Box:

Light bar system 10 includes a control box 22. Control box 22 is formed of any suitable size, shape and design and is configured to receive operational signals from the electrical system of vehicle 30, interpret these signals and output operational signals that control operation of light bar 10. Control box 22 includes a microprocessor 64 and memory 66 among other components. Microprocessor 64 is any device which receives informational signals, interprets these signals, and outputs information or commands based on instructions stored in memory 66. Memory 66 is any form of an informational storage device or system, such as RAM, flash memory, a hard drive, or the like. Information or instructions in the form of software, code, firmware or the like are stored on memory 66 and is accessible to microprocessor 64. Microprocessor 64 and memory 66 may be formed of a single unitary device, separate but electrically connected devices, or a plurality of separate but electrically connected devices.

Since light bar 10 is configured to be installed on practically any vehicle 30, microprocessor 64 and memory 66 are programmed to interpret signals from multiple types of vehicles and output the appropriate operational signals. That is, in one arrangement, microprocessor 64 and memory 66 are programmed to detect or determine what type of vehicle they are connected to and then determine the appropriate operational signal to output based on what operational signals are received as input. In this way, the use of control box 22 and microprocessor 64 and memory 66 allows for seamless utilization of a single light bar 10 for multiple makes and models of vehicle 30 without the need to program or reprogram the microprocessor 64 and memory 66 for each vehicle 30. This increases the speed and ease of installation and use.

Clip:

Clip 28 is formed of any suitable size, shape and design and is configured to connect light bar housing 12 to vehicle 30. In one arrangement, as is shown, clip 28 has a back wall 100 that extends between opposing end walls 102 and opposing sidewalls 104. Back wall 100 has a generally flat forward face 106 and a generally flat rearward face 108 that form planes that extend in approximate parallel spaced relation to one another. Opposing sidewalls 104 extend in approximate parallel spaced relation to one another, and opposing end walls 102 extend in approximate parallel spaced relation to one another. As such, sidewalls 104 and end walls 102 extend in approximate perpendicular alignment to one another thereby forming a generally rectangular member.

A pair of opposing arms 110 are connected to each end of clip 28. Arms 110 are connected to sidewalls 104 and extend upward a distance from forward face 106. The outward edge of arm 110 is in planar alignment with sidewall 104. The outward end of arm 110 is in alignment with end wall 102 and extends inward a distance therefrom. Arms 110 include a locking feature 112 positioned at their outward most end. Locking features 112 are formed of any suitable size, shape and design and are designed to engage and lock light bar housing 12 into clip 28. In one arrangement, locking features 112 are formed of a step or ledge or hook that matingly engage the feature 38 or step in the exterior surface of light bar housing 12 positioned at the intersection of cover portion 36 and sidewalls 34. In the arrangement shown, when clip 28 is viewed from the and end 102, locking features 112 on opposing arms 110 extend inward and over the forward face of back wall 100 a distance. Accordingly, to facilitate locking engagement, arms 110 extend upward from forward face 106 approximately the same distance as sidewall 34 of light bar housing 12.

To further facilitate a firm, durable and strong connection between clip 28 and light bar housing 12, arms 110 are slightly biased inward toward one another. This causes the distance between the outward ends of arms 110 to be slightly narrower than the width of light bar housing 12. As such, when light bar housing 12 is placed between opposing arms 110 and locked into place an inward force is applied on light bar housing 12 by arms 110. This helps to hold light bar housing 12 within clip 28. This also helps to keep engagement between locking feature 112 of arm 110 and the feature 38 of light bar housing 12.

Due to the slight inward bias of the arms 110 of clip 28, the outward most ends of arms 110 include a curved or angled guiding surface 114. Guiding surface 114 helps to guide the light bar housing 12 into the space between opposing arms 110. In the arrangement shown, guiding surface 114 curves or angles inward from the upper most end of arms 110 down to the step of locking feature 112. This causes the upper ends of guiding surface 114 to be wider than the width of back wall 32 of light bar housing 12, while the lower end of guiding surface 114 is narrower than the width of back wall 32 of light bar housing 12. This causes the arms 110 to flex or bend outward as the light bar 10 is forced within the clip 28.

The rearward face 108 of back wall 100 is flat and thereby provides maximum surface area for connection to the body of vehicle 30. This allows for the use of an adhesive, such as a double-sided tape or foam or gel to be positioned between the rearward face 108 of clip 28 and the body of vehicle 30. Using adhesive eliminates the need to put screws or bolts into the body of vehicle 30, simplifies the installation process, speeds the installation process, eliminates the need to use tools to install the clips 28 and provides a durable installation.

Despite that the installation process that uses adhesives instead of drilling and screwing, back wall 100 includes an opening 116 therein that facilitates reception of a screw or other fastening device therein if the installer chooses to use a fastener. In one arrangement, to ensure the head of the screw does not protrude, the opening 116 is countersunk. That is, the walls of the opening angle inward as they extend from forward face 106 to rearward face 108.

Installation and Use:

The light bar system 10 is installed by first placing adhesive on the rearward face 108 of a plurality of clips 28. In one arrangement, the clips 28 are then adhered to the body of vehicle 30. Once the clips 28 are installed on the vehicle 30, the light bar housing 12 is aligned with the clips 28 and the light bar housing 12 is forced into the clips 28. Alternatively, the clips 28 are installed onto the light bar housing 12 and then the light bar housing 12 and clips 28 are simultaneously installed onto the body of the vehicle 30.

When the light bar housing 12 is forced into the clips 28, the back wall 32 of light bar housing 12 engages the upper or outward end of the guiding surface 114 of arms 110 of clips 28. As the guiding surfaces 114 angle inward and because the arms 110 are angled slightly inward, force is applied causing the arms 110 to elastically bend outward as the light bar housing 12 is forced downward between opposing arms 110. The arms 110 continue to bend outward until the ledge or step of features 112 of clip 28 passes or engages the step or features 38 of light bar housing 12. At this point the locking features 112 of arms 110 engage or lock onto the step or features 38 of light bar housing 12 thereby locking the light bar housing 12 within the clip 28 with a strong and durable connection. In this position, the flat back wall 32 of light bar housing 12 is in flat and flush engagement with the forward face 106 of the flat back wall 100 of clip 28. In this position, the exterior surface of sidewalls 34 of light bar housing 12 are in flat and flush engagement with the interior faces of arms 110 of clip 28. In this position, the lower surface of features 112 in the end of arms 110 are in flat and flush locking engagement with the upper surface of the features 38 of the light bar housing 12.

Once the light bar housing 12 is installed, the plug 60 and signal lead 62 are connected to the electrical system of the vehicle 30. Once electrically connected, the control box 22 and microprocessor 64 and memory 66 receive power and operational signals from the electrical system of the vehicle 30. The microprocessor 64 interprets these signals according to the instructions stored in memory 66 and outputs operational signals that control operation of the light bar 10.

Dimensions:

In one arrangement, to ensure that the light bar system 10 fits practically every commercially available pickup truck, in one arrangement, the light bar system 10 comes in two lengths, 60 inches or 48 inches. The use of these two lengths facilitates use on practically all commercially available pickup trucks. Any other length is hereby contemplated for use. The light bar has a depth approximately ⅜ of an inch without the clip 28 and approximately ½ of an inch with the clip 28 installed. The light bar 10 has a height of approximately ⅝ of an inch without the clip 28 and ¾ of an inch with the clip 28 installed. In one arrangement, the clips 28 are approximately 3 and ¼ inches long. Any other depth or width is hereby contemplated for use.

Method of Manufacture of Light Bar:

In one arrangement, the light bar system 10 is manufactured in the following manner.

The light bar housing 12 is extruded of a clear plastic material and the back wall 32 and the rear portions of the sidewalls 34 (nontransparent portion 44) are painted with a dark or black color. Alternatively, the light bar housing 12 is extruded and the nontransparent portion 44 is extruded of a nontransparent material whereas the transparent portion 42 is extruded of a transparent material.

Next, the circuit board 14 is formed in segments 16. This is accomplished by installing the LEDs 46 onto the circuitry layer 50 and then installing the LEDs 46 and circuitry layer 50 on the backing material 48. Once the LEDs 46 are installed onto the circuit board 14 a first layer 120 of encapsulant 20 is laid over the LEDs 46 and the exterior facing surface 55 of circuit board 14.

Encapsulant 20 is formed of any flowable material that seals the LEDs 46 and circuit board 14. In one arrangement, encapsulant 20 is a flowable material when initially applied that later cures to a non-flowable material. In one arrangement, encapsulant 20 is a flowable plastic material that is transparent or translucent. In one arrangement, while the encapsulant 20 is initially flowable, it hardens to a rigid, semi-rigid, flexible or rubber-like material.

Next, the separate segments 16 are connected together by aligning the adjacent segments 16 in end-to-end engagement thereby forming seamline 54 there between and then an adhesive is laid over the rearward face of the circuit board 14, such as a glue, paste, tape, double sided tape or the like. This using an adhesive such as a double-sided tape, gel or the like holds the two segments 16 together while also provides for adhesion of ribbon wire 63 to the back of circuit board 14 as well.

Since both segments 16 have ribbon wire 63 extending outward from an end of the segment 16, and it is desirable to have wires only coming out one end of the light bar housing 12, the ribbon wire 63 of one segment 16 is folded around and onto the back of circuit board 14 such that both ribbon wires 63 extend out of the same end of light bar system 10. In this position, the adhesive holds the folded ribbon wire 63 in place on the back of circuit board 14.

Now that both ribbon wires 63 extend outward from the same end of circuit board 14, the combined and assembled circuit board 14 formed of both segments 16 is slid into the hollow interior 40 of light bar housing 12 through an open end of the light bar housing 12 until the assembled circuit board 14 is fully installed within the hollow interior 40 of light bar housing 12.

Once fully installed, an end cap 18 is positioned over each end. Once installed, the end caps 18 are sealed in place.

Next, to fully encapsulate the light bar housing 12, the light bar housing 12 is vertically aligned, so as to help the bubbles flow out of the hollow interior 40 of the light bar housing 12 and a second layer 122 of encapsulant 20 is injected through the lower end cap 18 and into the remaining air-space within the hollow interior 40 of light bar housing 12. This encapsulant 20 fills most if not all of the voids and spaces within the hollow interior 40 thereby providing an additional contaminant and water proofing barrier. In one arrangement, this second layer 122 of encapsulant 20 is over-flowed, that is more encapsulant 20 is forced into the hollow interior 40 of the light bar housing 12 such that the excess escapes out the opposite end of the light bar housing 12 and in doing so, excess air bubbles are forced out of the hollow interior 40. The encapsulant 20 is left to cure over time. Once cured the light bar 10 is ready for use.

When encapsulant 20 is properly injected within the hollow interior 40 of light bar housing 12, the second layer 122 of encapsulant 20 fills all of the air space left within the hollow interior 40 of light bar housing 12. In one arrangement, the second layer 122 surrounds all portions of the circuit board 14 and engages the entire exterior surface of the circuit board 14 as well as engages the entire interior surface of the hollow interior 40 of housing 40. By filling all of the air space within the hollow interior 40 of light bar housing 12 after the circuit board 14 has been inserted within the hollow interior 40 this prevents any water or contamination from getting into the hollow interior 40 by filling this space already. In addition, even if water or contaminants did get into the hollow interior 40 of housing 40 this water or contaminants would not be able to get to the circuit board 14 itself as the circuit board 14 is fully encapsulated within the second layer 122 of encapsulant 20. In addition, the LEDs 46 are also encapsulated by the first layer 120 or encapsulant 20 thereby providing a second layer of protection. This these first and second layers 120, 122 of encapsulant 20 are protected by being housed within the sealed light bar housing 12 thereby protecting the encapsulant 20 from exposure to water and contaminants not to mention physical contact and abuse. By forming the light bar housing 12 out of a single continuous extrusion, this prevents water or contaminants from getting into light bar housing 12 except for the ends which are covered by end caps 18 that are sealed in place and then sealed again with second layer 122 of encapsulant 20. In way, a light bar system 10 is provided that is extremely durable and practically impenetrable.

Replacement Tail Light:

Similar technological concepts and components to those described above may be incorporated into a replacement tail light system 210 (also referred to as replacement tail light 210). The present disclosure contemplates the inclusion of any components of the light bar system 10 described above for use in the replacement tail light system 210 and essentially "incorporates by reference" the above section. For example, the replacement tail light 210 for installation on a vehicle 30 having an electrical system may incorporate a circuit board 214 having LEDs 246 and independently controllable segments 241, 242, 243, encapsulant 220, a control box 222 having a microprocessor 264 and memory 266, wiring 256, a fuse 258, a plug 260, and signal leads 262.

The shape and size of the tail light housing are often restrained by the make and model of the vehicle 30. Sometimes, in order to avoid drilling additional holes into the body of the vehicle 30, or for aesthetic appeal, it may be preferred that the external shape of the replacement tail light housing be made to substantially imitate the shape and size of the existing tail light housing. On the other hand, it may be desired or required to alter the internal shape of the replacement tail light housing to compensate for the addition of the circuit board 214 and LEDs 246 and the removal of a traditional light bulb such that the tail light has a partially, generally, or completely hollow interior.

FIGS. 9A-F show various views of an exemplary tail light housing 212 designed for use on a Jeep. In the embodiment shown, the tail light housing 212 is secured to the body of the vehicle 30 via known fasteners 228 (such as screws). The tail light housing 212 is polygonal in nature and includes an interior side face 231, a back face 232, an exterior side face 233 having a turn signal segment 243, a top face 234, a bottom face (not shown because the bottom face is a mirror image of the top face 234), and a cover 240 having transparent or translucent sections and a non-transparent front face 244. The transparent or translucent sections are positioned in front of a reverse light segment 241 and brake light segments 242 and allow light emitted from the light segments to pass through. The interior side face 231, back face 232, exterior side face 233, top face 234, and non-transparent front face 244 may form one monolithic piece or several pieces that attach to one another. The faces may comprise plastic, metal, fiberglass, other known materials used in conventional tail light housings, or any combination thereof.

FIG. 10 shows a detailed view of the replacement tail light system 210, and more specifically shows how the circuit board 214 is positioned just behind the transparent break segments 242 of the tail light housing 212.

A controller or control box 222 is electrically connected to the electrical system of the vehicle 30 and the tail light 210. The controller may be secured inside the hollow interior of the tail light housing 212. The controller 222 has a microprocessor 264 and memory 266 and is configured to receive signals from the electrical system of the vehicle 30, interpret the signals received from the electrical system of the vehicle 30, and in response control illumination of the independently controllable segments 241, 242, 243 (which may or may not be electrically connected to one another). The controller 222 may also be configured to select LEDs 246 to illuminate based on their color, select the duration of illumination of the LEDs 246, and simultaneously control illumination of LEDs 46 of a light bar 10 installed on the vehicle 30. Ideally, the controller 222 may be used with a plethora of different vehicles such that the controller 222 is generally universal. Additionally, it may be preferred that the controller is limited to interpreting signals from the electrical system of the vehicle 30 and responding to such signals, rather than altering the signals of the electrical system itself. Doing so may help the operator of the vehicle 30 avoid voiding warranties that are associated with some of the components of the electrical system of the vehicle 30.

Space between the outward facing surface of the circuit board 214 and an inward facing surface of the tail light housing 212 may be filled with an encapsulant 220 thereby sealing the LEDs 246 within the tail light housing 212, and the encapsulant 220 may be formed of a flowable plastic. The outward facing surface of the circuit board 214 may be black in color thereby minimizing the noticeability of the tail light 210 when not in operation.

Figure 11:
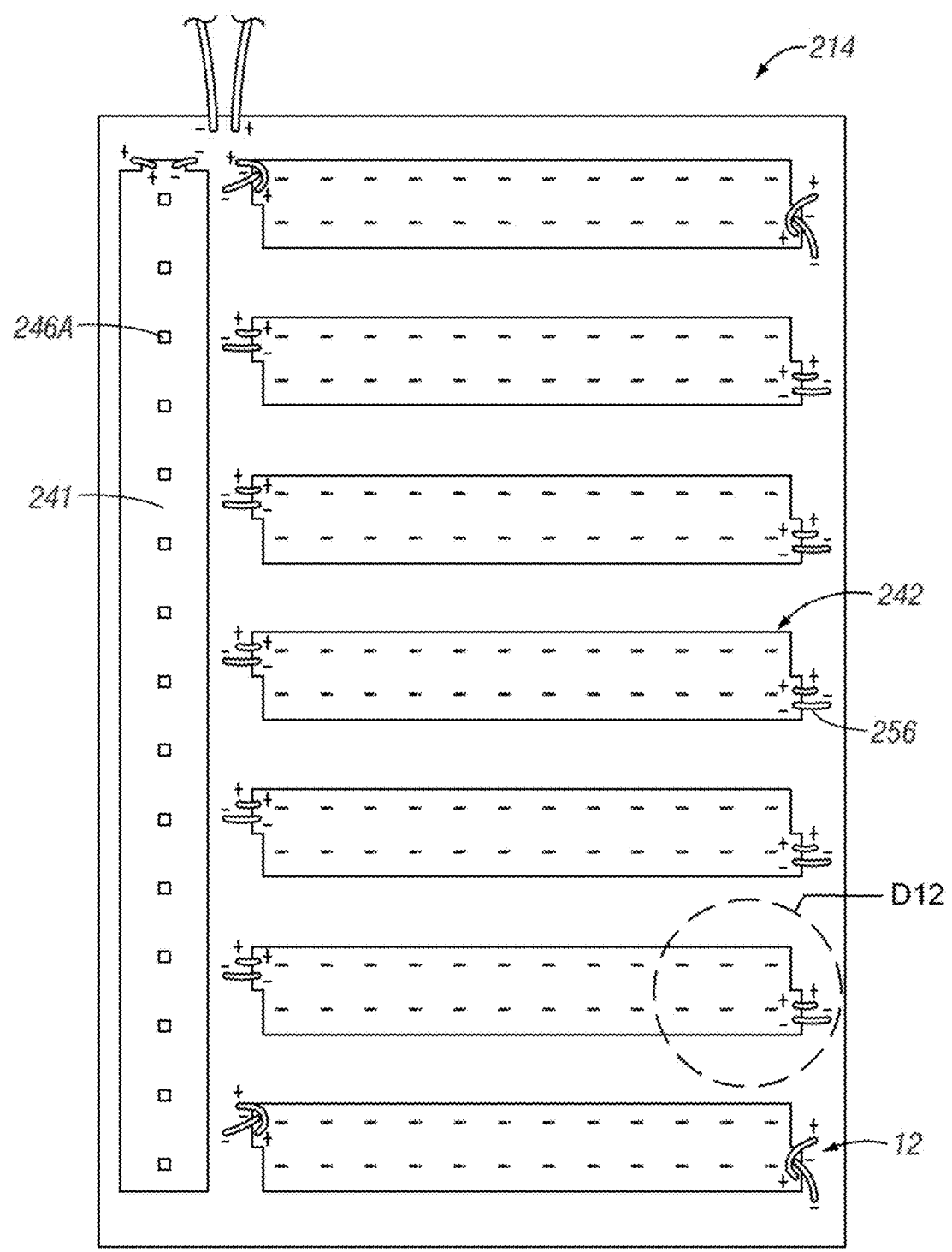
FIG. 11 is a front elevation view of an exemplary circuit board to be incorporated within a tail light according to aspects of the present disclosure.
Figure 12:
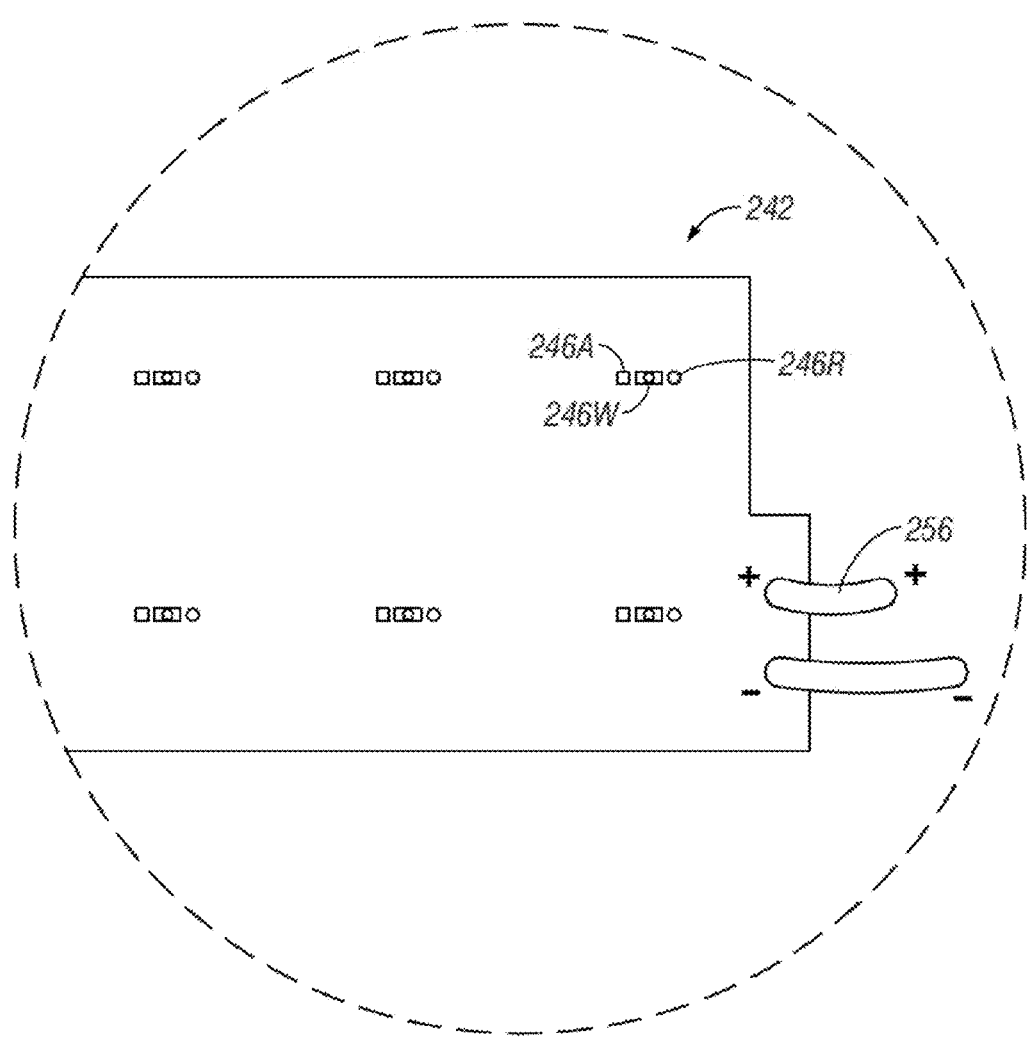
FIG. 12 is a detailed view of an exemplary independently controllable segment from FIG. 11 inside detail D12 according to aspects of the present disclosure.
Figure 13:
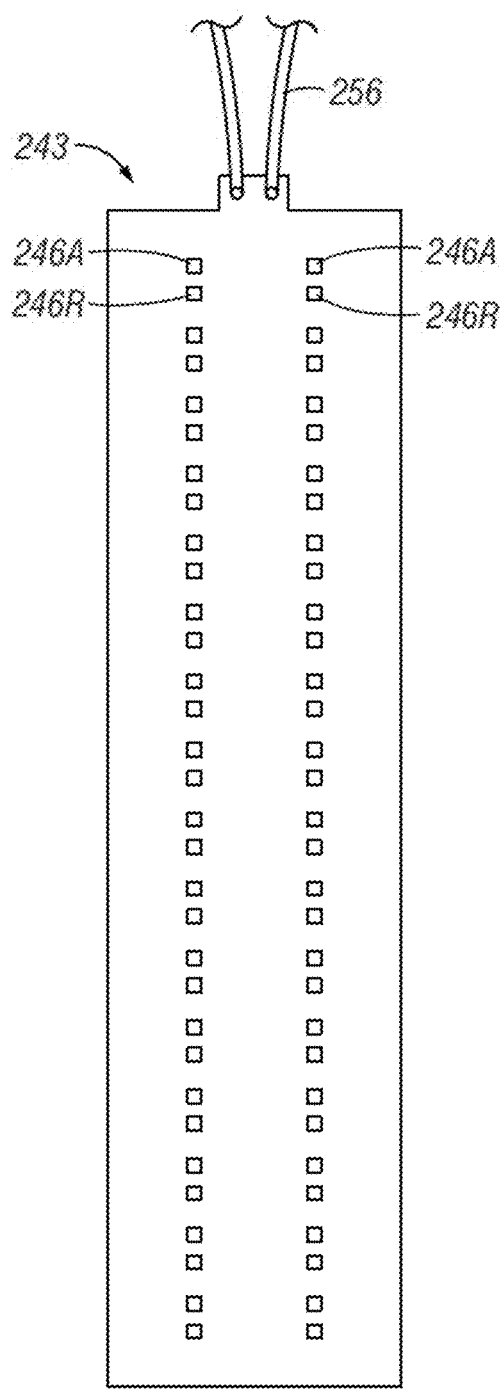
FIG. 13 is a front elevation view of an exemplary independently controllable segment to be incorporated behind the exterior side face of a tail light according to aspects of the disclosure.

FIGS. 11-13 show exemplary embodiments of the circuit board 214 positioned within the hollow interior of the tail light housing 212. The circuit board 214 comprises independently controllable segments 241, 242, 243 having light emitting diodes (LEDs) 246 configured to transmit light from an outward facing surface of the circuit board. According to aspects of the present disclosure, the LEDs 246 may be chip-on-board LEDs, and may emit any color light. The circuit board 214 is not limited to the configurations shown, as the LEDs 246 may be positioned on the circuit board 214 to achieve any desirable strobing pattern or color configuration.

At least one portion of the tail light housing 212 covering the LEDs 246 is formed of a transparent or translucent plastic material and allows the LEDs 46 located on the independently controllable segments 241, 242, 243 to be easily seen. The independently controllable segments include horizontally oriented brake light segments 242 on the front face of the tail light housing 212 positioned in a column. In at least one embodiment, the portions made up of the translucent plastic material filter only specific colors of light (e.g., red, amber, blue, green). In such an embodiment, the tail light 210 may use LEDs 246 that emit solely white light (as white light comprises all visible colors of light). The operator of the vehicle could then customize the appearance of the light based on the color of the translucent plastic material used.

In at least one other embodiment, only some of the LEDs 246 located on the brake light segments 242 emit white light (as is shown in FIG. 12, wherein the exemplary white LEDs are denoted 246W) when turned on. In such an embodiment, the white LEDs 246W turn on when the controller 222 receives a signal from the electrical system of the vehicle 30 that the vehicle 30 is in reverse. The remaining LEDs 246 emit red light (wherein exemplary red LEDs are denoted 246R in FIGS. 12-13) when turned on and turn on when the controller 222 receives a signal from the electrical system of the vehicle 30 that brakes of the vehicle 30 are applied, and the remaining LEDs that emit red light flash when the controller 222 receives a signal from the electrical system of the vehicle that hazards of the vehicle 30 are applied or a corresponding turn signal of the vehicle 30 is applied. Optionally, the tail light 210 may further comprise additional LEDs 246 on the circuit board 214 that emit blue light when turned on and flash when the controller 222 receives a police siren signal from the electrical system of the vehicle 30.

The remaining LEDs that emit red light on individual brake light segments 242 may be turned on at different times and staggered with respect to the LEDs 246 located on different individual brake light segments 242 to create an optical pattern when the controller 222 receives a signal from the electrical system of the vehicle 30 that the turn signal is applied. The optical pattern may be specifically designed for a left turn signal, a right turn signal, or the hazards of the vehicle 30. Any known optical patterns may be used. In the preferred embodiment, the optical pattern may be selectively customized by the operator of the vehicle.

For example, the individual brake light segments 242 may flash in rapid succession in an ascending or descending fashion to create an "optical glissando." The term "optical glissando" is not intended to be limited to a situation where two LEDs 246 are not allowed to flash simultaneously, but is simply used to describe the phenomenon where the overall pattern of the light appears to be continuously moving in a single direction. The plural form of optical glissando, "optical glissandi," is used by the present disclosure to indicate the repetition of an optical glissando in a uniform or otherwise predictable manner across a short time frame.

In an alternative embodiment, the independently controllable segments further include a vertically oriented turn signal segment 243 on the exterior side face of the tail light housing 212 and a vertically oriented reverse light segment 241 on the cover 240 of the tail light housing 212 located to the left or right of the brake light segments 242 on the non-transparent front face 244 of the tail light housing 212. The vertically oriented reverse light segment 241 spans the length of the column of brake light segments 242. The LEDs 46 located on the turn signal segment 243 emit amber light (wherein exemplary amber LEDs are denoted 246A in FIGS. 11-13), the LEDs 246 located on the brake light segments 242 emit red light, and the LEDs 246 located on the reverse light segment 241 emit white light.

Replacement Tail Light Method of Manufacture:

A similar method of manufacture is contemplated for the manufacture of replacement tail light 210 for vehicle 30. The replacement tail light 210 may be assembled in a substantially similar way as the light bar 10. Any of the components, processes, techniques, or method steps disclosed in the above section titled "Method of Manufacture of Light Bar" may be incorporated into the manufacture of the replacement tail light 210.

In one embodiment, the method includes providing a tail light housing 212 configured to replace an existing tail light housing of an existing tail light of the vehicle 30. The tail light housing 212 has a hollow interior. The method includes providing a circuit board 214 having independently controllable segments 16 which have light emitting diodes (LEDs) 246 configured to transmit light from an outward facing surface of the circuit board 214. The method includes inserting the circuit board 214 within the hollow interior of the tail light housing 212 and flowing a second layer of encapsulant 220 into the hollow interior of the tail light housing 212 after the circuit board 214 is inserted within the hollow interior of the tail light housing 212 thereby filling at least some of the remaining space within the hollow interior of the tail light housing 212 with encapsulant 220. The LEDs 246 are then sealed within the tail light housing 212. The sealing step may be accomplished by flowing a first layer of encapsulant 220 over the outward facing surface of the circuit board 214 and allowing the first layer of encapsulant 220 to cure thereby sealing the LEDs 246 of the circuit board 214 prior to inserting the circuit board 214 into the hollow interior of the tail light housing 212.

Chip-On-Board LEDs:

In one arrangement, LEDs 46 and 246 are what are known as Chip-On-Board LEDs. COB LED technology describes the mounting of a bare LED chip in direct contact with the substrate to produce LED arrays. It is a method of LED packaging which has a number of advantages over traditional surface mount technologies such as the use of "T-pack" and Surface mount LEDs.

Due to the small size of the LED chip, Chip-on-Board technology allows for a much higher packing density than surface mount technology. This results in higher intensity & greater uniformity of light for the user.

COB light source can save about 30% cost in the application, mainly lie in LED package cost, light engine production costs and the secondary light distribution costs, which is of great significance for many applications. In performance, through the rational design and micro-lens molding, a COB light module can avoid the defects of point and glare light and other deficiencies of prior art LEDs. COB modules make the production of lighting simpler and more-convenient, and reduce costs effectively. In production, existing technology and equipment can support high yield and large-scale COB module manufacturing, assembly and installation. As such, the use of COB LEDs provides many advantages including brighter illumination and an appearance of a single continuous light instead of a plurality of individual lights.

Control Box Algorithm and Operation:

One problem associated with adding a light bar 10 having red, white and amber LEDs 46 is that a break light signal and a turn signal from the vehicle's electrical system are indistinguishable, but it is desirable for the light bar 10 to illuminate the amber LEDs 46A on the appropriate segment 16 of the light bar 10 for a turn signal while it is desirable to illuminate the red LEDs 46R of both segments 16 for a break light. In addition, to provide the maximum visibility and safety, it is desirable to illuminate both the red LEDs 46R of a segment 16 and the amber LEDs 46A when the breaks are applied while the turn signal is on. Yet, again, in many applications, the break and turning signals are indistinguishable from one another as they merely appear as power to a line through plug 60.

Similar problems persist when trying to customize the illumination of LEDs 246 with a replacement tail light 210.

To accomplish this functionality, and separate the turn signals from break signals, microprocessor 64 and memory 66 of control box 22 use an algorithm that is capable of determining whether a signal is a break signal or a turn signal and from this determination the control box 22 illuminates the appropriate segment(s) 16 of light bar 10 or segments 241, 242, 243 of replacement tail light 210 and the appropriate color(s) of LEDs 46.

More specifically, in one arrangement, control box 22 receives power and four electrical operational signals from the electrical system of the vehicle 30. These four operational signals are: (1) a tail light signal (which is a low power signal on both the right tail light lead and the left tail light lead), (2) a reverse light signal, (3) a left blinker/brake signal, and (4) a right blinker/brake signal.

The reverse signal is simply a pass-through signal. For example, when the reverse signal is received, the white LEDs 46W of both segments 16 are illuminated. Similarly, the tail light signal (meaning that the tail lights of the vehicle are to be illuminated at a low level, such as when the headlights are on) is also a pass-through signal. That is, when the tail light signal is received, the red LEDs 46R of both segments 16 are illuminated, at a low illumination level. As such, there is essentially no need to perform processing on the reverse light signal or the tail light signal.

However, processing is required to determine whether a signal is a turn signal or a break signal. The algorithm processes three functions passed along in two wires; left turn signal which is represented as a blinking signal on the left signal lead; right turn signal which is represented as a blinking signal on a right signal lead; and brake signal which is represented as a solid or continuous signal simultaneously present on both the left and right signal leads. The right and left turn signals are mutually exclusive, but the brake signal can be present at any time for any duration.

The software algorithm uses memory of the current state and the recent past state of the right signal lead and the left signal lead to determine what function is most likely active at a point in time. That is whether it is a break signal or a turn signal. The algorithm observes the rate at which a turn signal is flashing to estimate when the next signal should arrive, and the algorithm acts accordingly if that signal either does or does not arrive. The software contains a state machine to take care of most situations, and also employs timers to keep certain states from running too long.

In addition, the algorithm adapts to the speed of the turn signal for each vehicle, so that if a nondeterministic state is incorrectly determined, the function only lasts the minimum time necessary. This reduces the time that an erroneous output is displayed (an output that may not be in sync with the vehicle). For example, a brake released at just the right time may activate an errant turn signal, e.g. flash of the amber LEDs 46A of a segment 16. This functionality adds to the universal nature of the light bar.

As such, the control box 22 extrapolates these four electrical operational signals from the electrical system of vehicle 30 into the following functions using an algorithm:

Break Light: The control box 22 detects a simultaneous solid high-intensity illumination on both the right signal lead and the left signal lead. For example, the control box 22 outputs a high intensity illumination on both segments 16 of red LEDs 46R.

Breaks Applied and Right Turn Signal Active: The control box 22 detects a constant signal on left turn signal lead and intermittent signal on the right turn signal lead. For example, the control box 22 outputs a high intensity illumination on both segments 16 of red LEDs 46R while simultaneously outputting a flashing illumination of the amber LEDs 46A on the right segment 16 of light bar 10.

Breaks Applied and Left Turn Signal Active: The control box 22 detects a constant signal on right turn signal lead and intermittent signal on the left turn signal lead. For example, the control box 22 outputs a high intensity illumination on both segments 16 of red LEDs 46R while simultaneously outputting a flashing illumination of the amber LEDs 46A on the left segment 16 of light bar 10.

No Break Applied and Right Turn Signal Active: The control box 22 does not detect a signal on the left turn signal lead while detecting an intermittent signal on the right turn signal lead. For example, the control box 22 outputs a flashing illumination of the amber LEDs 46A on the right segment 16 of light bar 10.

No Break Applied and Left Turn Signal Active: The control box 22 does not detect a signal on the right turn signal lead while detecting an intermittent signal on the left turn signal lead. For example, the control box 22 outputs a flashing illumination of the amber LEDs 46A on the left segment 16 of light bar 10.

Hazards: Detecting hazards is equivalent to detecting a break light signal. That is, the control box 22 detects a simultaneous solid high-intensity illumination on both the right signal lead and the left signal lead. For example, the control box 22 outputs a high intensity illumination on both segments 16 of red LEDs 46R. In one arrangement, a timer function is used to detect the periodic illumination on both the right signal lead and the left signal lead and microprocessor 64 determines that this continued cycling of this signal is indeed a hazard signal and the microprocessor 64 instead illuminates that amber LEDs 46A until the periodic cycling ceases.

From the above discussion and the accompanying drawings and claims it will be appreciated that the light bar system and method of use and method of manufacture presented offers many advantages over the prior art. That is, the handlebar mounted tool system and method of use presented; improves upon the state of the art; has a long useful life; can be used on practically any vehicle; fits in the space between the bumper and the tailgate of most pickup trucks; is water proof; is weather proof; can be exposed to the elements; is contaminant proof; is easily installed; can be connected to practically any vehicle's electrical system; provides multi-purpose functionality; has an aesthetically pleasing appearance; is easy to use; improves safety; includes white, yellow/amber and red lights; includes breaking, backup and turning functionality; efficiently dissipates heat; is separated into electrical segments that are independently controllable; is bright; is formed of a plurality of lights but appears to be a single continuous light strip when illuminated; can be installed without drilling into the body of the vehicle; is durable; is rugged; has an intuitive design; is formed of a minimum number of parts; is relatively inexpensive to manufacture; provides value, utility and novelty to the user; has a low profile; can be installed with adhesives and clips, among countless other improvements and advantages.

It will be appreciated by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in light thereof will be suggested to persons skilled in the art and are to be included within the spirit and purview of this application.

What is claimed is:

1. A tail light for installation on a vehicle having an electrical system, comprising:
    a tail light housing configured to replace an existing housing of an existing tail light of the automobile, the tail light housing having a hollow interior;
    a circuit board positioned within the hollow interior of the tail light housing and comprising independently controllable segments having light emitting diodes (LEDs) configured to transmit light from an outward facing surface of the circuit board; and
    a controller electrically connected to the electrical system of the vehicle and the tail light,
    wherein:
        the controller has a microprocessor and memory; and
        the controller is configured to receive signals from the electrical system of the vehicle, interpret the signals received from the electrical system of the vehicle, and in response control illumination of the independently controllable segments;
    wherein LEDs of some of the independently controllable segments are turned on at different times and staggered with respect to the LEDs located on different independently controllable segments to create an optical pattern when the controller receives a signal from the electrical system of the vehicle.

2. The tail light of claim 1, wherein space between the outward facing surface of the circuit board and an inward facing surface of the tail light housing is filled with an encapsulant thereby sealing the LEDs within the tail light housing, and further wherein the encapsulant is formed of a flowable plastic.

3. The tail light of claim 1, wherein the controller is further configured to select LEDs to illuminate based on their color.

4. The tail light of claim 1, wherein the controller is configured to select the duration of illumination of the LEDs.

5. The tail light of claim 1, wherein the LEDs are chip-on-board LEDs.

6. The tail light of claim 1, wherein the outward facing surface of the circuit board is black in color thereby minimizing the noticeability of the tail light when not in operation.

7. The tail light of claim 1, wherein at least one portion of the tail light housing covering the LEDs is formed of a transparent or translucent plastic material.

8. The tail light of claim 7, wherein the tail light housing is polygonal in nature and includes a back face, top and bottom faces, an exterior side face, an interior side face, a cover including a non-transparent front face, and means for attaching the tail light housing to the rear portion of the automobile.

9. The tail light of claim 8, wherein the independently controllable segments are electrically connected to one another.

10. The tail light of claim 9, wherein the independently controllable segments include horizontally oriented brake light segments located behind the at least one portion of the tail light housing positioned in a column.

11. The tail light of claim 10, wherein the independently controllable segments further include a first vertically oriented reverse light segment or turn signal segment on the exterior side face of the tail light housing and a second vertically oriented reverse light segment or turn signal segment on the cover of the tail light housing adjacent to the brake light segments on the cover of the tail light housing.

12. The tail light of claim 11, wherein the LEDs located on the first reverse light or turn signal segment emit amber light, the LEDs located on the brake light segments emit red light, and the LEDs located on the second reverse light or turn signal segment emit white light.

13. The tail light of claim 10, wherein:
    some of the LEDs located on the brake light segments emit white light when turned on and turn on when the controller receives a signal from the electrical system of the vehicle that the vehicle is in reverse;
    the remaining LEDs emit red light when turned on and turn on when the controller receives a signal from the electrical system of the vehicle that brakes of the vehicle are applied; and
    the remaining LEDs that emit red light flash when the controller receives a signal from the electrical system of the vehicle that hazards of the vehicle are applied or a corresponding turn signal of the vehicle is applied.

14. The tail light of claim 13, wherein the remaining LEDs that emit red light on individual brake light segments are turned on at different times and staggered with respect to the LEDs located on different individual brake light segments to create an optical pattern when the controller receives a signal from the electrical system of the vehicle that the turn signal is applied.

15. The tail light of claim 14, wherein the optical pattern is designed for a left turn signal.

16. The tail light of claim 13, further comprising additional LEDs on the circuit board that emit blue light when turned on, the additional LEDs flashing when the controller receives a police siren signal from the electrical system of the vehicle.

17. The tail light of claim 1, wherein the controller is generally universal.

18. The tail light of claim 1, wherein the controller is configured to simultaneously control illumination of LEDs of a light bar installed on the vehicle.

* * * * *